US012164241B2

(12) United States Patent
Hirose et al.

(10) Patent No.: US 12,164,241 B2
(45) Date of Patent: Dec. 10, 2024

(54) IMAGE FORMING APPARATUS

(71) Applicant: CANON KABUSHIKI KAISHA, Tokyo (JP)

(72) Inventors: Masaki Hirose, Kanagawa (JP); Masatake Usui, Shizuoka (JP); Hiroki Eguchi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/220,654

(22) Filed: Jul. 11, 2023

(65) Prior Publication Data

US 2024/0019795 A1 Jan. 18, 2024

(30) Foreign Application Priority Data

Jul. 12, 2022 (JP) ................................ 2022-112087

(51) Int. Cl.
*G03G 15/043* (2006.01)

(52) U.S. Cl.
CPC ................................ *G03G 15/043* (2013.01)

(58) Field of Classification Search
CPC ........................ G03G 15/043; G03G 15/0266
See application file for complete search history.

(56) References Cited

U.S. PATENT DOCUMENTS

2013/0142528 A1* 6/2013 Watanabe ............ G03G 15/043 399/46
2022/0308520 A1* 9/2022 Kobayashi ............ G03G 21/08

FOREIGN PATENT DOCUMENTS

JP 2003-302808 A 10/2003
JP 2016-133782 A 7/2016
JP 2016-177270 A 10/2016
JP 2020-042148 A 3/2020

* cited by examiner

*Primary Examiner* — Sandra Brase
(74) *Attorney, Agent, or Firm* — Venable LLP

(57) ABSTRACT

An image forming apparatus includes a photosensitive drum and an exposure unit for exposing a surface of the photosensitive drum to form an image by a first exposure amount. In a rotational axis direction of a charging portion, a width of a transfer portion is shorter than that of a developing portion, a width of the transfer portion is shorter than that of the charging portion and an end portion of the surface includes a non-transfer area in contact with the charging portion and not in contact with the transfer portion. The voltage having the normal polarity is applied to the transfer portion when no recording material exists at the transfer portion, and the exposure unit exposes an area, including the non-transfer area of the surface that has passed through the transfer portion during application of the voltage, by a second exposure amount less than the first exposure amount.

21 Claims, 7 Drawing Sheets

IMAGE FORMING APPARATUS

FIELD OF THE INVENTION AND RELATED ART

The present invention relates to an image forming apparatus such as a laser beam printer, a copy machine, and a facsimile machine using an electrophotographic method.

Conventionally, in the image forming apparatus using the electrophotographic method, a surface of a photosensitive member is charged substantially uniformly by a charging means to form a dark portion potential on the surface of the photosensitive member. The surface of the photosensitive member after the charging process is then exposed by an exposure means to form a light portion potential on the surface of the photosensitive member, and an electrostatic latent image is formed on the photosensitive member by a contrast between the above dark portion potential and the above light portion potential. Then, toner is supplied to the electrostatic latent image formed on the photosensitive member by a developing means to form a toner image on the photosensitive member. A developing device provided with a developing roller, which is a roller-shaped developing member, is often used as the developing means.

A toner image formed on the photosensitive member is transferred onto a recording material by a transfer means. A transfer roller, which is a roller-shaped transfer member, is often used as the transfer means. The transfer roller contacts the photosensitive member to form a transfer portion (transfer nip portion). The transfer roller nips and conveys the recording material between the photosensitive member, and transfers the toner on the photosensitive member onto the recording material. During the transfer, a transfer voltage having an opposite polarity to a normal charging polarity of the toner (normal polarity) is applied to the transfer roller, and the toner image on the photosensitive member is electrostatically transferred onto the recording material, Incidentally, although the recording material is sometimes referred to as a "paper", the recording material is not limited to the paper, but may also be materials mainly made of synthetic resin such as an OHP sheet and a synthetic paper, etc. In addition, for the sake of convenience, a high/low (large/small) and an up/down of electric potential and voltage shall refer to the high/low (large/small) and the up/down when compared in terms of absolute values of electric potential and voltage.

Here, there is a method for charging the photosensitive member by using an electroconductive charging member that contacts the photosensitive member as the charging means, and applying voltage to the charging member to perform a charging. A charging roller, which is a roller-shaped charging member, is often used as the charging member. In addition, in such charging methods, there are two methods: an AC/DC charging method, in which an oscillating voltage superimposed with a direct current voltage (DC voltage) and an alternating current voltage (AC voltage) is applied to the charging member, and a DC charging method, in which only a direct current voltage (DC voltage) is applied to the charging member. An advantage of the DC charging method is that it does not require an AC power supply, thus making it possible to reduce a size and cost of an apparatus.

In addition, a pre-exposure means that exposes the surface of the photosensitive member is sometimes provided at a downstream side of a transfer position by the transfer means and at an upstream side of a charging position by the charging means with respect to a rotational direction of the photosensitive member to remove residual electric charge on the surface of the photosensitive member after the transfer process. An LED chip array, a fuse lamp, a halogen lamp, a fluorescent lamp, etc., are used as the pre-exposure means (charge eliminating means). In contrast, there is a pre-exposureless method that omits the pre-exposure means and that enables downsizing and reducing the cost of an apparatus.

In Japanese Patent Application Laid-open No. 2003-302808, an image forming apparatus with a simple configuration employing the DC charging method and the pre-exposureless method described above is proposed.

However, in the conventional image forming apparatus, in a case where a contact area of the photosensitive member contacting with the transfer roller is shorter than a contact area of the surface of the photosensitive member contacting with the charging roller with respect to a direction that is substantially perpendicular to a movement direction of the surface of the photosensitive member (conveyance direction of the recording material), it is found that following problems exist. Incidentally, the direction that is substantially perpendicular to the movement direction of the photosensitive member (conveyance direction of the recording material) (i.e., a direction that is substantially parallel to a rotational axis direction of the charging roller) is sometimes referred to as a "longitudinal direction". In addition, a length of the contact area of the surface of the photosensitive member contacting with the charging roller may be described simply as a length of the charging roller, and a length of the contact area of the surface of the photosensitive member contacting with the transfer roller may be described simply as a length of the transfer roller.

In the case where the length of the transfer roller is shorter than the length of the charging roller with respect to the longitudinal direction, an area where the charging roller contacts the photosensitive member and where the transfer roller does not contact the photosensitive member appears at an end portion with respect to the longitudinal direction. Here, an area of the surface of the photosensitive member where the transfer roller contacts is referred to as a "transfer area", and an area of the surface of the photosensitive member where the charging roller contacts but the transfer roller does not contact is referred to as a "non-transfer area". Considering the surface potential of the photosensitive member after the transfer, in the transfer area, the surface potential of the photosensitive member is lowered since the transfer voltage is applied when the toner image is transferred from the photosensitive member to the recording material. On the other hand, in the non-transfer area, the surface potential of the photosensitive member remains high since no transfer voltage is applied thereto. As a result, the surface potential of the photosensitive member after the transfer will have a potential difference between the transfer area and the non-transfer area. Although the potential difference becomes smaller during a subsequent charging process, the potential difference gradually rises as the photosensitive member repeatedly passes through the transfer portion. For example, in a configuration where a reverse developing method using a toner having a negative chargeability is employed, the above non-transfer area is negatively charged by the charging roller but not positively charged by the transfer roller. Therefore, when the charging is repeated in a continuous image formation, etc., in the above non-transfer area, the surface potential of the photosensitive member may rise to an excessive negative potential since a charge eliminating effect is not obtained by a positive charging by the transfer roller.

The phenomenon, in which the surface potential of the non-transfer area in the end portion of the photosensitive member with respect to the longitudinal direction rises to an excessive potential as described above, tends to be more significant when the image forming apparatus employs the DC charging method, in which an equalization effect of the potential by the alternating current voltage is not obtained, and furthermore when the pre-exposureless method is employed.

And when the surface potential of the non-transfer area in the end portion of the photosensitive member with respect to the longitudinal direction rises to the excessive potential as described above, following problems may occur, for example.

For example, with respect to the longitudinal direction, there is a configuration where a toner coated area on the developing roller (developing area) is longer than the contact area of the surface of the photosensitive member contacting with the transfer roller. In this configuration, the developing area is opposing both the transfer area and the non-transfer area of the photosensitive member. If the surface potential in the non-transfer area of the photosensitive member rises to the excessive potential as described above, a "reverse fogging" may occur, in which an "opposite toner" charged with the opposite polarity to the normal charging polarity adheres to the surface of the photosensitive member. In a case where the toner adhering to the non-transfer area on the surface of the photosensitive member increases due to this "reverse fogging", a cleaning defect may occur. Then, due to the cleaning defect, an "end portion stain", in which the end portion of the recording material with respect to the direction substantially perpendicular to the conveyance direction of the recording material is stained by the toner, may occur.

In addition, when the surface potential of the non-transfer area in the end portion of the photosensitive member with respect to the longitudinal direction rises to the excessive potential, it may cause an electric discharge between the photosensitive member and a core metal portion of the transfer roller in the non-transfer area, resulting in damage such as leakage marks to the surface of the photosensitive member due to an insulation breakdown. Then, when a charge voltage is applied to the charging member while the damage is on the photosensitive member, current may concentrate in the damaged portion, causing the applied voltage to the charging member to drop. As a result, the photosensitive member, including other areas, cannot be brought to a desired surface potential, and a streak image in the longitudinal direction may occur due to the charging defect.

SUMMARY OF THE INVENTION

An object of the present invention, then, is to suppress the excessive rise of the surface potential of the end portion of the photosensitive member with respect to the longitudinal direction in a configuration where the contact area of the surface of the photosensitive member contacting with the transfer member is shorter than the contact area of the surface of the photosensitive member contacting with the charging member with respect to the longitudinal direction.

The above object is achieved with an image forming apparatus according to the present invention. In summary, the present invention is an image forming apparatus comprising a rotatable photosensitive member; a rotatable charging member configured to form a charging portion in contact with the photosensitive member and to charge a surface of the photosensitive member at the charging portion; an exposure unit configured to expose the surface of the photosensitive member, charged by the charging member, by a first exposure amount and to form an electrostatic image on the surface of the photosensitive member; a developing member configured to form a developing portion in contact with the photosensitive member and to form a toner image by supplying toner charged with a normal polarity to the electrostatic image formed on the surface of the photosensitive member at the developing portion; a transfer member configured to form a transfer portion in contact with the surface of the photosensitive member and to transfer the toner image to a recording material from the surface of the photosensitive member at the transfer portion by application of a transfer voltage having an opposite polarity to the normal polarity; a transfer power source configured to apply voltage to the transfer member; and a control portion configured to control the exposure unit and the transfer power source, wherein in a rotational axis direction of the charging member, a width of the transfer portion is shorter than a width of the developing portion, a width of the transfer portion is shorter than a width of the charging portion and an end portion of the surface of the photosensitive member in the rotational axis direction includes a non-transfer area in contact with the charging member and not in contact with the transfer member, wherein the control portion controls to cause the transfer power source to apply the voltage having the normal polarity to the transfer member when no recording material exists at the transfer portion, and to perform a first operation in which the exposure unit exposes an area, including the non-transfer area of the surface of the photosensitive member that has passed through the transfer portion during application of the voltage, by a second exposure amount smaller than the first exposure amount.

Further features of the present invention will become apparent from the following description of exemplary embodiments with reference to the attached drawings.

DESCRIPTION OF THE EMBODIMENTS

Hereinafter, an image forming apparatus according to the present invention will be described in more detail with reference to the drawings.

(1) Image Forming Apparatus

Figure 1:
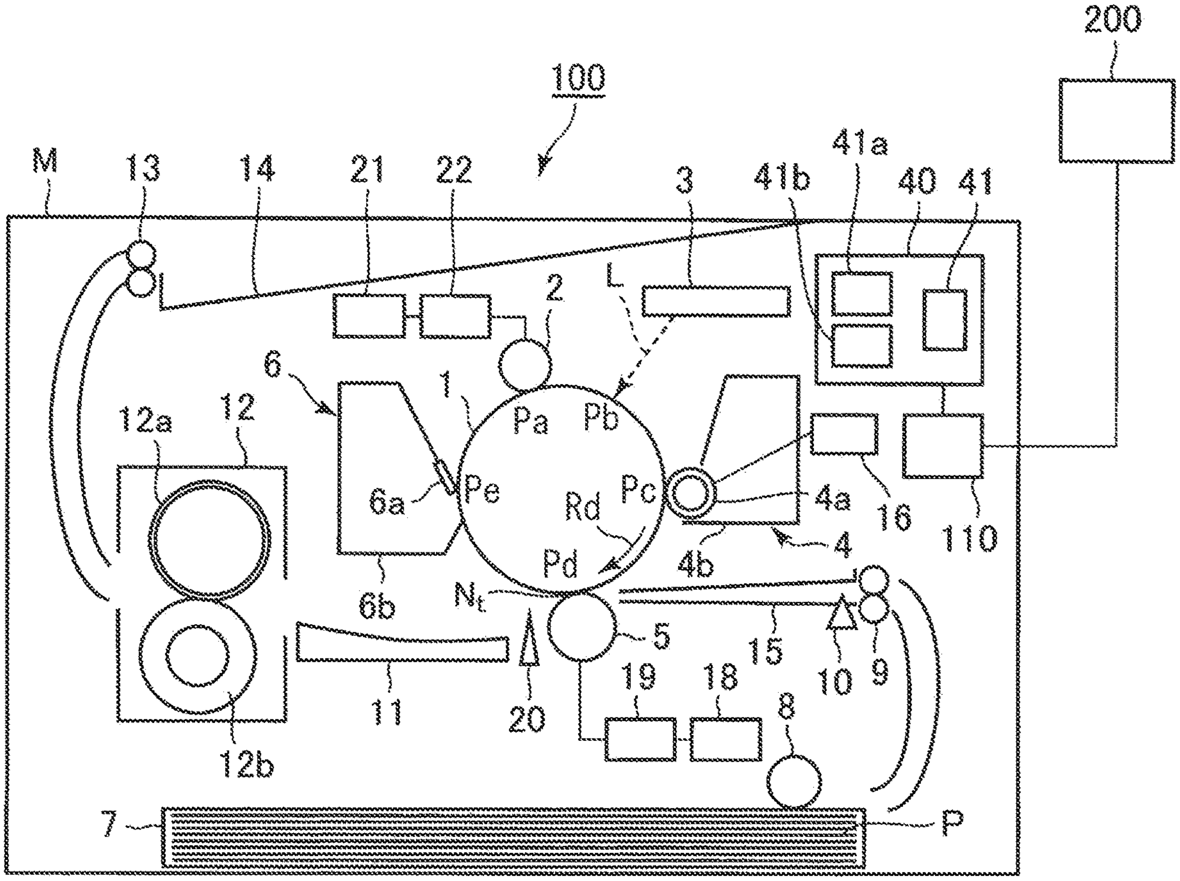
FIG. 1 is a schematic cross-sectional view of an image forming apparatus.

First, a configuration of an image forming apparatus 100 of an Embodiment 1 will be described. FIG. 1 is a schematic cross-sectional view of the image forming apparatus 100 of the present Embodiment. The image forming apparatus 100 of the present Embodiment is an electrophotographic laser printer, which can form an image on a recording material P in response to image information input from an external device 200 such as a personal computer.

The image forming apparatus 100 is provided with a photosensitive drum 1 which is a drum-shaped (cylindrical) photosensitive member (electrophotographic photosensitive member) as an image bearing member inside an apparatus main body M. The photosensitive drum 1 is constituted by a cylindrical drum substrate made of aluminum or nickel, etc., on which a photosensitive material such as an organic photoconductor (OPC), an amorphous selenium, and an amorphous silicon is provided. The photosensitive drum 1 used in the present Embodiment is the OPC having a negative chargeability with an outer diameter of 24 mm. This photosensitive drum 1 is constituted by a conductive substrate made of an aluminum cylinder, a surface of which includes a photosensitive layer in which a charge-generating layer and a charge-transporting layer are layered in this order from a side of the conductive substrate.

Around the photosensitive drum 1, following means are disposed in order along a rotational direction Rd of the photosensitive drum 1. First, a charging roller 2, which is a roller-shaped charging member, as a charging means is disposed. Next, an exposure device 3 as an exposure means is disposed. Next, a developing device 4 as a developing means is disposed. Next, a transfer roller 5, which is a roller-shaped transfer member (transfer rotation member), as a transfer means is disposed. Next, a charge eliminating needle 20 as a charge eliminating means is disposed. Next, a cleaning device 6 as a cleaning means is disposed.

The charging roller 2 is constituted by, for example, a conductive base shaft (core metal) that also serves as a power supply electrode and an elastic layer that surrounds an outer circumferential surface of the conductive base shaft in a cylindrical shape. The charging roller 2 used in the present Embodiment is an elastic roller including a roller with an outer diameter of 10 mm, a core metal with a diameter of 5 mm, and an elastic layer with a thickness of 2.5 mm. In the present Embodiment, SUS is used for the core metal and a rubber mixture material mixed with nitrile butadiene rubber (NBR) and epichlorohydrin is used for the elastic layer. The charging roller 2 is pressed against the photosensitive drum 1 and is rotationally driven by a rotation of the photosensitive drum 1. The charging roller 2 is disposed so that a rotational axis direction of the charging roller 2 is substantially parallel to a direction (widthwise direction) which is substantially perpendicular to a movement direction of the surface of the photosensitive drum 1. With respect to a rotational direction of the photosensitive drum 1, a position on the photosensitive drum 1 where a charging by the charging roller 2 is performed is a charging position Pa. The charging roller 2 charges the surface of the photosensitive drum 1 by an electric discharge that occurs in at least one of minute gaps formed at an upstream side and a downstream side of a contact portion between the charging roller 2 and the photosensitive drum 1 with respect to the rotational direction of the photosensitive drum 1. This is referred to as an "electric discharge charging". In addition, the charging roller 2 also charges the surface of the photosensitive drum 1 by injecting an electric charge at the contact portion between the charging roller 2 and the photosensitive drum 1. This is referred to as an "injection charging". For simplicity's sake, the contact portion between the charging roller 2 and photosensitive drum 1 may be considered as the charging position (charging portion) Pa.

In the present Embodiment, the exposure device 3 is constituted by a laser scanner device (laser optical system). With respect to the rotational direction of the photosensitive drum 1, a position on the photosensitive drum 1 where an exposure by the exposure device 3 is performed is an exposing position (exposing portion) Pb.

In the present Embodiment, the developing device 4 uses a non-magnetic one-component developer (toner) as a developer. The developing device 4 is provided with a developing roller **4*a* as a developer bearing member (developing member) and a developer container 4*b*. The developing roller 4*a* contacts the surface of the photosensitive drum 1 upon a development and supplies the toner to a developing portion, which is an opposing (contacting) portion to the photosensitive drum 1. The developing container 4*b* is a container accommodating developer, and the developer accommodated in the developing container 4*b* is supplied to the developing roller 4*a*. Incidentally, the developing device 4 may use, as the developer, a magnetic one-component developer (toner) or a two-component developer which is provided with toner and a carrier. With respect to the rotational direction of the photosensitive drum 1, a position on the photosensitive drum 1 where the toner is supplied by the developing roller 4*a* (in the present Embodiment, a position where the photosensitive drum 1 contacts the developing roller 4*a***) is a developing position (developing portion) Pc.

The transfer roller 5 is urged (pressed) toward the photosensitive drum 1 by a transfer pressing spring (not shown), which is an urging member as an urging means, and is pressed against the photosensitive drum 1. As a result, a transfer portion (transfer nip portion) $N_t$ is formed, which is a contact portion between the photosensitive drum 1 and the transfer roller 5. The transfer roller 5 is rotationally driven by the rotation of the photosensitive drum 1. The transfer roller 5 nips and conveys the recording material P with the photosensitive drum 1, and transfers the toner image from the photosensitive drum 1 to the recording material P as voltage is applied. The transfer roller 5 is constituted by, for example, a conductive base shaft (core metal) that also serves as a power supply electrode and an elastic layer that surrounds an outer circumferential surface of the conductive base shaft in a cylindrical shape. As the elastic layer, generally a semi-conductive rubber material constituted by using EPDM, NBR, SBR, urethane rubber, epichlorohydrin, silicone rubber, etc., is used. In a composition of the elastic layer, an appropriate amount of a conductive agent, e.g., an ion conductive agent is contained. The transfer roller 5 used in the present Embodiment is an elastic roller including a roller with an outer diameter of 14 mm, a core metal with a diameter of 5 mm, and an elastic layer with a thickness of 4.5 mm. In the present Embodiment, SUS is used for the core metal and a rubber mixture material mixed with NBR and epichlorohydrin is used for the elastic layer. In addition, in the present Embodiment, a contacting pressure of the transfer roller 5 against the photosensitive drum 1 is 9.8 N (1 kgf). In addition, in the present Embodiment, an electric resistance value (hereinafter simply referred to as a "resistance value") of the transfer roller 5 is $2.0\times10^{8}\Omega$ in a state in which the transfer roller 5 is pressed against an aluminum cylinder with the contacting pressure of 9.8 N and rotated at 50 mm/sec, and +1000 V is applied to the transfer roller 5. Incidentally, this resistance value of the transfer roller 5 is a resistance value which is obtained when the transfer roller 5 is left under a condition of a normal temperature and a normal humidity at an initial use (when the transfer roller 5 is new). With respect to the rotational direction of the photosensitive drum 1, a position on the photosensitive drum 1 where the toner image is transferred to the recording material P (a position corresponding to the transfer portion $N_t$ described above) is a transfer position Pd.

The charge eliminating needle 20 eliminates an excessive electric charge on the surface of the recording material P after the transfer and reduces unevenness of the electric potential on the photosensitive drum 1 caused by a separating discharge. As the charge eliminating needle 20, a static eliminating needle made of a thin metal plate material such as a SUS plate or an aluminum plate having a preferable conductivity and provided with a serrated sharp end portion can be used. The charge eliminating needle 20 is disposed so that a tip portion of the charge eliminating needle 20 opposes the surface of the photosensitive drum 1 at a downstream side of the transfer roller 5 with respect to the conveyance direction of the recording material P.

The cleaning device 6 cleans adherent materials such as the toner remaining on the photosensitive drum 1 after the transfer (transfer residual toner). In the present Embodiment, the cleaning device 6 is provided with a cleaning blade 6*a* as a cleaning member disposed so as to contact the surface of the photosensitive drum 1 and a cleaning container 6*b*. With respect to the rotational direction of photosensitive drum 1, a position on the photosensitive drum 1 where a removing of the toner by the cleaning blade 6*a* is performed (in the present Embodiment, a position where the cleaning blade 6*a* contacts) is a cleaning position (cleaning portion) Pe.

In addition, a recording material cassette (sheet feed tray) 7 in which the recording material (transfer material, recording medium, sheet) P such as a paper is accommodated is disposed below the apparatus main body M in the Figure. In addition, along a conveyance path of the recording material P from the recording material cassette 7, a feeding roller 8, a conveyance roller 9, a top sensor 10, a pre-transfer conveyance guide 15, a conveyance guide 11 between the transfer and the fixing, a fixing device 12, a discharging roller 13, and a discharge tray 14 are disposed in this order. In addition, in the apparatus main body M, a control portion 40 that controls the image forming apparatus 100 and a video controller 110 that performs an image processing, etc., are disposed.

Next, an image forming operation of the image forming apparatus 100 according to the present Embodiment will be described. The photosensitive drum 1 is driven and rotated by a drive source (not shown) in a direction of an arrow Rd in the Figure (clockwise direction) at a circumferential speed (process speed) of 320 mm/sec. The surface of the rotating photosensitive drum 1 is charged by the charging roller 2 to a predetermined potential (dark portion potential, charging potential) of the same polarity as the normal charging polarity of the toner (negative polarity in the present Embodiment) in a substantially uniform manner. During the charging process, a charge voltage (charge bias), which is a direct current voltage of negative polarity, is applied to the charging roller 2 from a charging power supply (high voltage power supply) 21 via a charging current detection circuit 22. In the present Embodiment, as an example, the charge voltage of −1100 V is applied to the charging roller 2 and the dark portion potential of −500 V is formed on the surface of the photosensitive drum 1.

The surface of the photosensitive drum 1 after the charging is scanned and exposed by the exposure device 3 according to the image information. The video controller 110 of the image forming apparatus 100 processes image information input to the image forming apparatus 100 from the external device 200 to generate time-series electric digital pixel signals, which are input to the control portion 40. The exposure device 3, which is controlled by the control portion 40, outputs a laser beam L modulated according to the above time-series electric digital pixel signals, and scans and exposes the charged surface of the photosensitive drum 1 with the laser beam L. By this, an electrostatic latent image (electrostatic image) is formed on the photosensitive drum 1. In the present Embodiment, the electric charge of a portion exposed by the exposure device 3 on the photosensitive drum 1 is removed, and a light portion potential of −100 V is formed on the surface of the photosensitive drum 1. As a result, the electrostatic latent image is formed on the photosensitive drum 1 by a contrast between the above dark portion potential and the above light portion potential.

The electrostatic latent image formed on the photosensitive drum 1 is developed (visualized) by the toner supplied by the developing device 4 to form the toner image (toner figure, developer image) on the photosensitive drum 1. During the development, a developing voltage (developing bias), which is a direct current voltage of the same polarity as the normal charging polarity of the toner (negative polarity in the present Embodiment), is applied to the developing roller 4*a* from a developing power source (high voltage power source) 16. In the present Embodiment, as an example, the developing voltage of −380 V is applied to the developing roller 4*a*. In the present Embodiment, the toner charged with the same polarity as the charging polarity of the photosensitive drum 1 (negative polarity in the present Embodiment) adheres to the exposing portion (image portion) on the photosensitive drum 1, where the absolute value of the potential is lowered by being exposed after being charged in the substantially uniform manner (reversal development method). In the present Embodiment, the normal charging polarity of the toner, which is a primary charging polarity of the toner during the development, is negative polarity.

The toner image formed on the photosensitive drum 1 is transferred onto the recording material P by an action of the transfer roller 5 in the transfer portion $N_t$. During the transfer, a transfer voltage (transfer bias), which is a direct current voltage having an opposite polarity to the normal charging polarity of the toner (in the present Embodiment, a positive polarity), is applied to the transfer roller 5 from a transfer power source (high voltage power source) 18 via a transfer current detection circuit 19 as a transfer current detection means. In the present Embodiment, as an example, the transfer voltage of about +1000 V is applied to the transfer roller 5. By this, the toner image on the photosensitive drum 1 is electrostatically transferred to a predetermined position on the recording material P. The recording material P is accommodated in the recording material cassette 7 as a recording material accommodating portion, and is fed one by one from the recording material cassette 7 by the feeding roller 8 as a feeding member. The recording material P is conveyed by the conveyance roller 9 as a conveyance member, and is supplied to the transfer portion $N_t$ along the pre-transfer conveyance guide 15 as a guide member. The conveyance roller 9 is controlled based, on a detection result of a leading end of the recording material P with respect to the conveyance direction of the recording material P by the top sensor 10 as a recording material detection means, etc., and supplies the recording material P to the transfer portion $N_t$ so as to align a timing with the toner image on the photosensitive drum 1.

The excessive electric charge on the surface of the recording material P, to which the toner image is transferred at the transfer portion $N_t$, is eliminated by the charge eliminating needle 20. The recording material P after passing through the charge eliminating needle 20 is conveyed along the conveyance guide 11 between the transfer and the fixing as a guide member to the fixing device 12 as a fixing means. The fixing device 12 is provided with a fixing roller 12*a* that incorporates a heater and a pressing roller 12*b* that is in pressure contact with the fixing roller 12*a*. The fixing device 12 applies heat and pressure to the recording material P bearing an unfixed toner image that passes through a nip portion between the fixing roller 12*a* and the pressing roller 12*b* to fix (melt and fix) the toner image on the recording material P.

In a case of a single-sided image formation, the recording material P on one side of which the toner image is fixed by the fixing device 12 is discharged (output) by the discharging roller 13 onto the discharge tray 14 formed on an upper surface of the apparatus main body M in the Figure. Incidentally, the image forming apparatus 100 may have a configuration capable of a double-sided image formation in which the image forming apparatus 100 reverses a front side and back side of the recording material P on a first side of which the toner image is fixed, reverses the conveyance direction of the recording material P to convey the recording material P again to the transfer portion $N_t$, and transfers and fixes the toner image on a second side of the recording material P.

On the other hand, adherent materials such as the toner remaining on the surface of the photosensitive drum 1 without being transferred to the recording material P during the transfer (transfer residual toner) are removed from the surface of the photosensitive drum 1 and collected by the cleaning device 6. The cleaning device 6 scrapes off the adherent materials such as the transfer residual toner from the surface of the rotating photosensitive drum 1 with the cleaning blade 6*a* and accommodates the scraped adherent materials in the cleaning container 6*b*.

By repeating the above operation, the image formation can be performed one after another. In the present Embodiment, the image forming apparatus 100 can execute a print operation at a print speed of 50 sheets per minute.

Incidentally, in the present Embodiment, the image forming apparatus 100 does not include a means for lowering the surface potential of the photosensitive drum 1 by irradiating light on the surface of the photosensitive drum 1 downstream of the transfer position Pd and upstream of the charging position Pa with respect to the rotational direction of the photosensitive drum 1 (pre-exposure apparatus).

In addition, the photosensitive drum 1 and at least one of the charging roller 2, developing device 4, and cleaning device 6 as process means acting thereon may integrally constitute a cartridge (process cartridge) that can be attached to and detached from the apparatus main body M.

The control portion 40 is configured to include a CPU 41 as a calculation control means, which is a central element that performs arithmetic processing, memories such as a ROM 41*a* and a RAM 41*b* as storage means, input/output portions (not shown) that control an exchange of signals between the control portion 40 and each portion outside the control portion 40, etc. The RAM 41*b*, which is a rewritable memory, stores information input to the control unit 40, detected information, calculation results, etc. and the ROM 41*a* stores control programs, data tables calculated in advance, etc. The CPU 41 and the memories such as the ROM 41*a* and the RAM 41*b* are mutually capable of transferring and reading data. The CPU 41 can control various operations related to image formation, etc., by executing various programs stored in the ROM 41*a*, while using the RAM 41*b* as a work area. Incidentally, in the ROM 41*a*, a data table of various control values (operation settings) set in advance and information of various thresholds set in advance, both of which are used in a control of a potential difference reducing operation and an image forming condition as described below, are stored.

Here, the image forming apparatus 100 performs a print job (print operation), which is a series of operations to form and output an image on the single recording material P or images on the multiple recording materials P, started by a single start instruction. The print job generally includes an image forming process, a pre-rotation process, a sheet (paper) interval process in a case where images are formed on the multiple recording materials P, and a post-rotation process. The image forming process is a period during which a formation of the electrostatic latent image of an image to be actually formed on and output to the recording material P, a formation of the toner image, and a transfer of the toner image are performed, and an image forming time refers to this period. More specifically, a timing of the image forming time differs between positions where each of processes of the formation of the electrostatic latent image, the formation of the toner image, and the transfer of the toner image is performed, and corresponds to a period when an image forming area on the photosensitive drum 1 is passing through each of the above positions. The pre-rotation process is a period between when the start instruction is input and when an image actually begins to be formed, and is a period when a preparatory operation prior to the image forming process is performed. The sheet interval process (image interval process, recording material interval process) corresponds to a period between when one recording material P passed and when the next recording material P comes in a case where image formations onto a plurality of recording materials P are continuously performed (continuous image formation, continuous printing). The post-rotation process is a period during which an organizing operation (preparatory operation) is performed after the image forming process. The non-image formation time, which is a period other than the image forming time, includes the pre-rotation process, the sheet interval process, and the post-rotation process described above, and further includes a pre-multi-rotation process, which is a preparatory operation when the image forming apparatus 100 is turned on or recovers from a sleep state, etc. More specifically, a timing of the non-image forming time corresponds to a period when a non-image forming area on the photosensitive drum 1 is passing through each of positions where the formation of the electrostatic latent, the formation of the toner image, and the transfer of the toner image mentioned above are performed. Incidentally, the image forming area on the photosensitive drum 1 or on the recording material P is an area where the toner image that is transferred to the recording material P and output from the imaging apparatus 100 can be formed, which is set in advance according to a size of the recording material P, etc., and the non-image forming area is an area other than the image forming area. Incidentally, in the present Embodiment, in predetermined areas of a leading end portion and a trailing end portion of the recording material P with respect to the conveyance direction of the recording material P, marginal portions which are the non-image forming areas are disposed, respectively. In addition, in the present Embodiment, also in predetermined areas of both ends of the recording material P with respect to a direction that is substantially perpendicular to the conveyance direction of the recording material P, the marginal portions which are the non-image forming areas are disposed, respectively.

(2) Positional Relationships with Respect to the Longitudinal Direction

Figure 2:
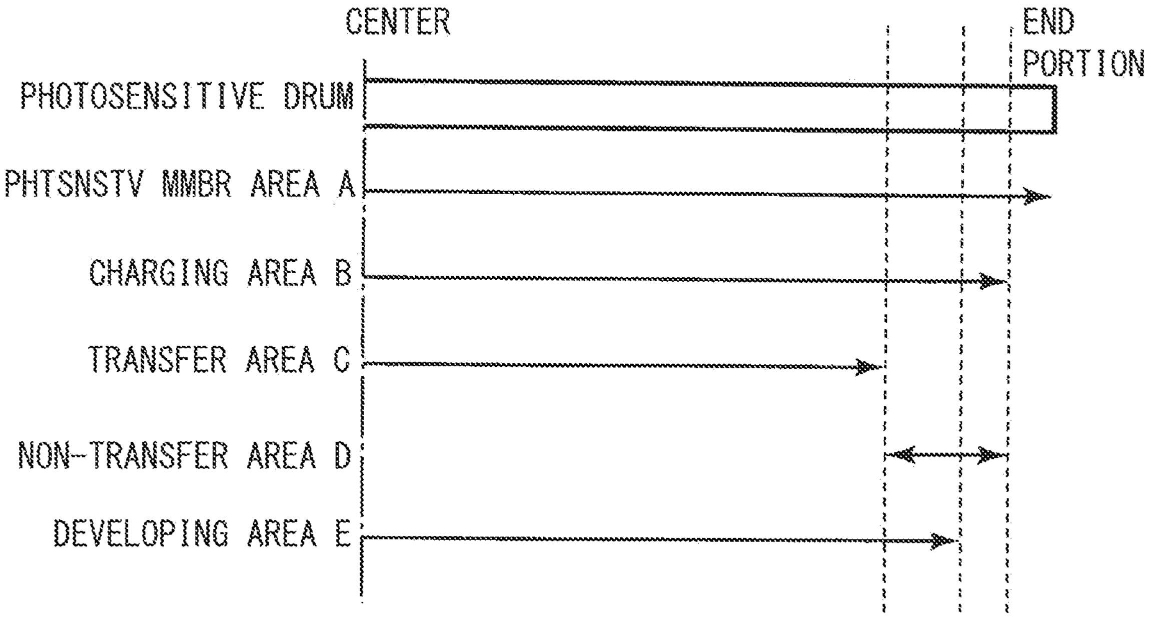
FIG. 2 is a schematic view illustrating positional relationships among each portion around a photosensitive drum with respect to a longitudinal direction.

FIG. 2 is a schematic view for illustrating positional relationships among each portion around the photosensitive drum 1 with respect to the direction that is substantially perpendicular to the movement direction of the surface of the photosensitive drum 1 (conveyance direction of the recording material P). Incidentally, the direction that is substantially perpendicular to the movement direction of the surface of the photosensitive drum 1 (conveyance direction of the recording material P) (i.e., the direction that is substantially parallel to the rotational axis direction of the charging roller 2) may be referred to as the "longitudinal direction".

In FIG. 2, a "photosensitive member area A" represents an area with respect to the longitudinal direction or a width of the area where the photosensitive layer of the photosensitive drum 1 is formed. In addition, a "charging area (charging portion) B" represents an area of the charging roller 2 with respect to the longitudinal direction or a width of the area that can contact the surface of the photosensitive drum 1. In addition, a "transfer area (transfer portion) C" represents an area of the transfer roller 5 with respect to the longitudinal direction or a width of the area that can contact the surface of the photosensitive drum 1. In addition, a "non-transfer area D" represents an area with respect to the longitudinal direction or a width of the area where the charging roller 2 contacts the photosensitive drum 1 and where the transfer roller 5 does not contact the photosensitive drum 1 (i.e., an area of difference between the charging area B and the transfer area C, or a width of the area). In addition, a "developing area (developing portion) E" represents an area of the developing roller 4*a* with respect to the longitudinal direction or a width of the area coated by the toner (toner coated area) (more specifically, an area or a width of the area on the developing roller 4*a* that is coated by the toner and that can contact the surface of the photosensitive drum 1). In the present Embodiment, the developing area E can also be referred to as an area or a width of the area where an opening for supplying the toner, which is the developer in the developing device 4, to the developing roller 4*a* is disposed on the developing container 4*b*. In other words, in the present Embodiment, the toner is supplied to the developing roller 4*a* in the area where the opening is disposed. Incidentally, for convenience sake, areas on the photosensitive drum 1 corresponding to the "charging area B", the "transfer area C", the "non-transfer area D", and the "developing area E" described above are also referred to as the "charging area B", the "transfer area C", the "non-transfer area D", and the "developing area E", respectively.

In the present Embodiment, the photosensitive member area A, the charging area B, the transfer area C, and the developing area E are disposed so that centers of these areas with respect to the longitudinal direction are approximately coincident with a center of the image forming area (area where toner images can be formed) with respect to the longitudinal direction, respectively (center reference). Therefore, among the above areas, areas with a relatively short width are encompassed inside areas with a relatively long width. Incidentally, in FIG. 2, a range from the center to one side of the end portion with respect to the longitudinal direction is illustrated.

In the present Embodiment, in the longitudinal direction, the transfer area C is shorter than the charging area B, and the end portion of the surface of the photosensitive drum 1 with respect to the longitudinal direction includes the non-transfer area D in contact with the charging roller 2 and in no contact with the transfer roller 5. In addition, in the present Embodiment, at least a part of the developing area E overlaps with the non-transfer area D with respect to the longitudinal direction. In other words, in the present Embodiment, the developing area E is shorter than the charging area B and longer than the transfer area C with respect to the longitudinal direction.

Figure 3:
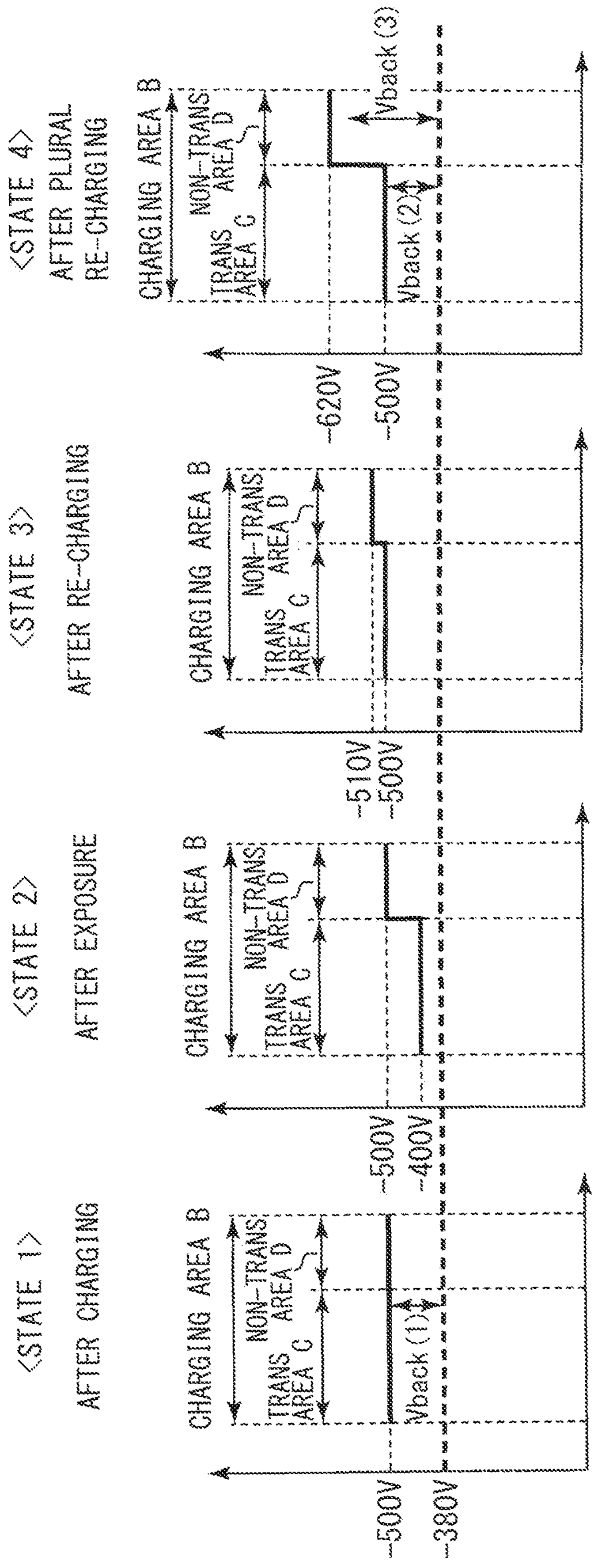
FIG. 3 is an explanatory view of a transition of a surface potential of the photosensitive drum in an image forming time.

(3) A Surface Potential Difference with Respect to the Longitudinal Direction of the Photosensitive Drum Next, a transition of the surface potential of the photosensitive drum 1 in a printing operation will be described using FIG. 3. In FIG. 3, a horizontal axis represents a position on the photosensitive drum 1 with respect to the longitudinal direction, and illustrates the charging area B, the transfer area C, and the non-transfer area D described above. In addition, in FIG. 3, a vertical axis represents the surface potential of the photosensitive drum 1, and the higher as it goes in FIG. 3, the higher the surface potential of the photosensitive drum 1 is on a negative side (i.e., an absolute value of the surface potential of the negative polarity is high). In addition, the surface potential of the photosensitive drum 1 of the charging portion B in FIG. 3 is the surface potential of a non-exposure portion on the photosensitive drain 1. Incidentally, in FIG. 3, a range of one side of the end portion with respect to the longitudinal direction is illustrated. In addition, the surface potential of the photosensitive drum 1 illustrated in FIG. 3, which will be described below, is a value that may vary depending on various conditions, such as environment, the type of the recording material P, etc. In addition, in the following description, "after charging" means after passing through the charging position Pa, "before transfer" means before reaching the transfer position Pd (transfer portion $N_t$), "after transfer" means after passing through the transfer position Pd (transfer portion $N_t$), and "before charging" means before reaching the charging position Pa, respectively.

First, a state 1 shows the surface potential of the photosensitive drum 1 after charging (and before transfer). In the state 1, the surface of the photosensitive drum 1 is charged to a predetermined dark portion potential Vd in a substantially uniform manner by the charging roller 2 to which a predetermined charge voltage is applied. In the example of FIG. 3, as an example, a charge voltage of −1100 V is applied to the charging roller 2 and the surface of the photosensitive drum 1 is charged to the dark portion potential Vd of −500 V during the charging.

Next, a state 2 shows the surface potential of the photosensitive drum 1 after transfer (and before recharging). When the recording material P passes through the transfer portion $N_t$, a positive transfer voltage is applied to the transfer roller 5 at the transfer portion $N_t$. Therefore, the surface potential of the photosensitive drum 1 of the transfer area C is lowered. On the other hand, in the non-transfer area D, since the photosensitive drum 1 and the transfer roller 5 are not in contact, no transfer voltage of the positive polarity is applied thereto. In addition, in the present Embodiment, there is no means for lowering the surface potential of the photosensitive drum 1 by irradiating light onto the surface of the photosensitive drum 1 after transfer and before charging, such as the pre-exposure means, for example. Therefore, in the non-transfer area D, the surface potential of the photosensitive drum 1 is substantially not lowered at all. As a result, a potential difference between the surface potential of the photosensitive drum 1 of the transfer area C and the surface potential of the photosensitive drum 1 of the non-transfer area E arises. In the example of FIG. 3, as an example, after the transfer, the surface potential of the photosensitive drum 1 of the transfer area C is −400 V, while the surface potential of the photosensitive drum 1 of the non-transfer area D remains −500 V. Incidentally, the potential difference between the surface potential of the photosensitive drum 1 of the transfer area C and the surface potential of the photosensitive drum 1 of the non-transfer area D is simply referred to as the potential difference between the transfer area C and the non-transfer area D.

Next, a state 3 shows the surface potential of the photosensitive drum 1 after recharging (and before transfer). The surface of the photosensitive drum 1 is charged again by the charging roller 2 under a condition where the potential difference is generated between the transfer area C and the non-transfer area D as described above. In the state 3, the same predetermined charge voltage (−1100 V) is applied to the charging roller 2 as described above. The surface potential of the photosensitive drum 1 of the transfer area C returns to the predetermined dark portion potential Vd (−500 V) after recharging, as described above. On the other hand, since the surface potential of the photosensitive drum 1 of the non-transfer area D is already equivalent to the dark portion potential Vd, the electric discharge charging does not occur, however, the surface potential thereof rises to −510V, which is higher than the predetermined dark portion potential Vd, due to the injection charging after recharging.

A state 4 shows the surface potential of the photosensitive drum 1 after passing through the transfer portion $N_t$ and the charging position Pa multiple times (after recharging multiple times and before transfer) with the charge voltage (−1100 V) being applied to the charging roller 2 constantly (continuously). The surface potential of the photosensitive drum 1 of the transfer area C returns to the predetermined dark portion potential Vd (−500 V), as described above, after charging. On the other hand, the surface potential of the photosensitive drum 1 of the non-transfer area D after charging gradually rises due to the injection charging that occurs at each time the surface of the photosensitive drum 1 passes through the charging position Pa. In the example of FIG. 3, as an example, the surface potential of the photosensitive drum 1 of the non-transfer area D is −620V and the potential difference with the surface potential of the photosensitive drum 1 of the transfer area C is 120V.

As described above, there may be a case where the surface potential of the photosensitive drum 1 includes the potential difference between the transfer area C and the non-transfer area D. And the potential difference between the transfer area C and the non-transfer area D may increase, and the surface potential of the photosensitive drum 1 of the non-transfer area D may rise excessively.

(4) Potential Difference Reducing Operation

Next, the potential difference reducing operation (potential difference reducing sequence, potential difference improving sequence, potential equalizing control), which is a first operation and which is to reduce the above potential difference between the transfer area C and the non-transfer area D in the present Embodiment will be described using FIG. 4. In the present Embodiment, the image forming apparatus 100 is capable of performing the potential difference reducing operation in which a negative polarity voltage is applied to the transfer roller 5 and the photosensitive drum 1 is exposed by the exposure device 3 in time duration when the toner image is not being transferred to the recording material P, such as the pre-rotation process, the sheet interval process, and the post-rotation process. The above negative polarity voltage applied to the transfer roller 5 in the potential difference reducing operation is direct current voltage of the same polarity as the normal charging polarity of the toner, i.e., the direct current voltage having the opposite polarity to the transfer voltage of the image forming time (during transfer) (hereinafter, simply referred to also as "negative bias"). By this, it is possible to reduce the above potential difference between the transfer area C and the non-transfer area D. Further details will be described in the following.

A case will be described as an example, where the potential difference reducing operation is performed from the state where the surface potential of the photosensitive drum 1 of the non-transfer area D is higher than the surface potential of the photosensitive drum 1 of the transfer area C (state 4) to reduce the potential difference between the transfer area C and the non-transfer area D.

First, in the potential difference reducing operation, in addition to charging the photosensitive drum 1 to the negative polarity by the charging roller 2, the negative polarity voltage (negative bias) is applied to the transfer roller 5. It is preferable to apply the negative bias to the transfer roller 5 such that the potential difference between the photosensitive drum 1 and the transfer roller 5 becomes lower than an electric discharge threshold (electric discharge beginning voltage). In the present Embodiment, the electric discharge threshold is about 600 V. As a result, the surface of the photosensitive drum 1 of the transfer area C is charged more to the negative polarity compared to the surface of the photosensitive drum 1 of the non-transfer area D, and the potential difference between the transfer area C and the non-transfer area D becomes relatively small. However, the surface potential of the photosensitive drum 1 becomes higher than the predetermined dark portion potential Vd since the photosensitive drum 1 is charged to the negative polarity by the transfer roller 5.

Next, in the potential difference reducing operation, the exposure device 3 exposes the photosensitive drum 1. At this time, the exposure device 3 performs an exposure with a smaller exposure amount than the exposure amount with which the exposure device 3 exposes the image forming portion during the image forming time (during exposure). The surface potential of the photosensitive drum 1, which becomes higher than the predetermined dark portion potential due to the application of the negative bias to the transfer roller 5 as described above, is optimized by performing the exposure by the exposure device 3. Here, a changing amount of the surface potential of the photosensitive drum 1 due to the exposure becomes larger when the surface potential before the exposure is higher. Therefore, it is possible to reduce the potential difference by the exposure even in a case where there is the potential difference between the transfer area C and the non-transfer area D before the exposure and the surface potential of the photosensitive drum 1 of the non-transfer area D is higher than that of the photosensitive drum 1 of the transfer area C.

Figure 4:
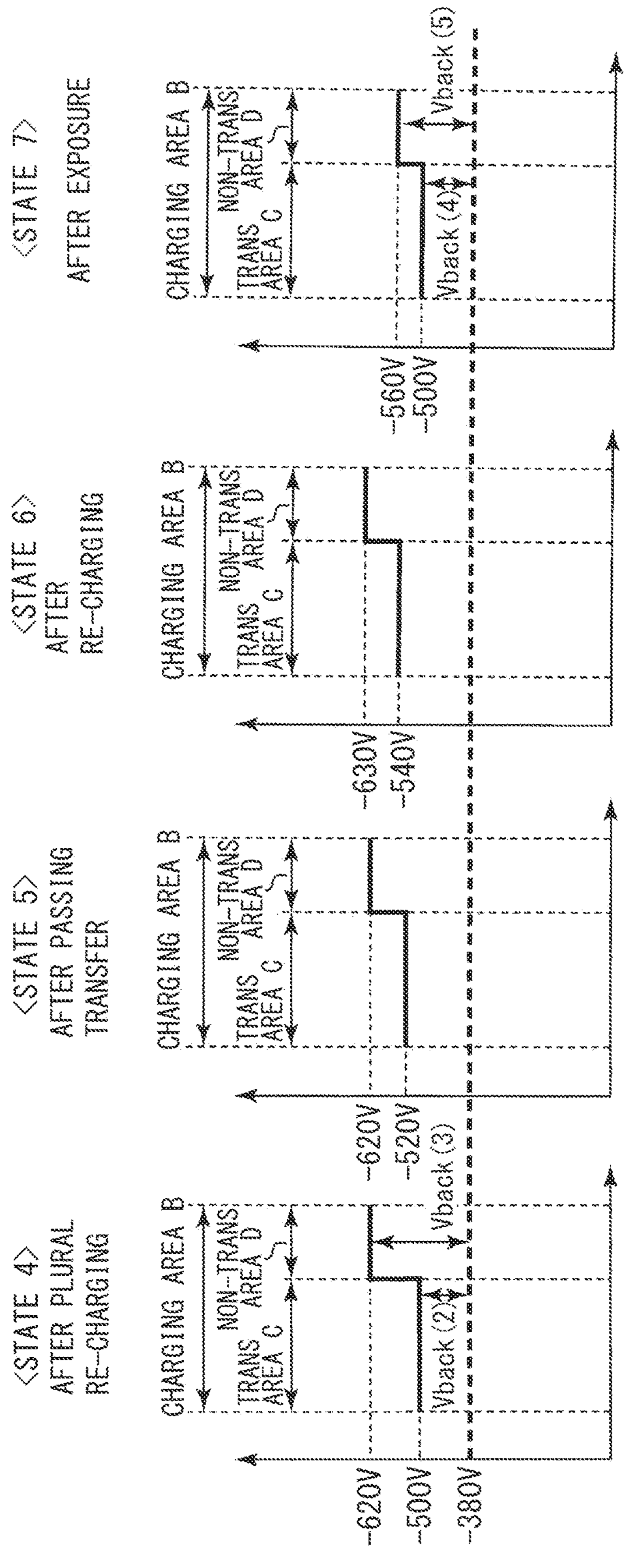
FIG. 4 is an explanatory view of the transition of the surface potential of the photosensitive drum in a potential difference reducing operation.

FIG. 4 shows a transition of the surface potential of the photosensitive drum 1 in the potential difference reducing operation of the present Embodiment. Meanings of a horizontal axis and a vertical axis of FIG. 4 are the same as those of FIG. 3, respectively.

First, a state 4 shows the surface potential of the photosensitive drum 1 after passing through the transfer portion $N_t$ and the charging position Pa multiple times (after multiple recharging and before transfer) with the charge voltage (−1100 V) being applied to the charging roller 2 constantly (continuously). This state is the same state as the state 4 of FIG. 3, where the potential of the photosensitive drum 1 of the transfer area C is −500 V, the surface potential of the photosensitive drum 1 of the non-transfer area D is −620 V and the potential difference between the transfer area C and the non-transfer area D is 120 V.

Next, a state 5 shows the surface potential of the photosensitive drum 1 after passing through the transfer portion $N_t$ (and before charging). In the state 5, a negative polarity voltage (negative bias) of −1000 V is applied to the transfer roller 5, as an example. As a result, the surface potential of the photosensitive drum 1 of the transfer area C rises. On the other hand, in the non-transfer area D, the negative polarity voltage is not applied because the transfer roller 5 is in no contact with the photosensitive drum 1. Therefore, the surface potential of the photosensitive drum 1 of the non-transfer area D does not rise. As a result, the potential difference between the transfer area C and the non-transfer area D becomes smaller than that in the state 4. In the example of FIG. 4, as an example, the surface potential of the photosensitive drum 1 of the transfer area C is −520 V, and the surface potential of the photosensitive drum 1 of the non-transfer area D remains −620 V.

Next, a state 6 shows the surface potential of the photosensitive drum 1 after recharging (and before transfer). The surface of the photosensitive drum 1 is charged again by the charging roller 2 under the condition where the potential difference is generated between the transfer area C and the non-transfer area D, as described above. In the state 6, the predetermined charge voltage (−1100 V) is applied to the charging roller 2, as described above. After recharging, the surface potential of the photosensitive drum 1 of the transfer area C becomes −540 V and the surface potential of the photosensitive drum 1 of the non-transfer area D becomes −630 V. In this recharging process, the lower the surface potential before recharging is, the larger the changing amount of the surface potential after recharging becomes. In other words, the lower the surface potential is, the larger an amount of injection charging from the charging roller 2 becomes. Therefore, the potential difference between the transfer area C and the non-transfer area D becomes smaller than that in the state 5.

Next, a state 7 shows the surface potential of the photosensitive drum 1 after exposure (and before transfer). The surface of the photosensitive drum 1 is exposed by the exposure device 3 under the condition where the potential difference is generated between the transfer area C and the non-transfer area D, as described above. In the present Embodiment, in the state 7, the exposure device 3 performs the exposure onto substantially an entire area of the photosensitive drum 1 with respect to the longitudinal direction (substantially an entirety of the photosensitive member area A or the charging area B) with the lower exposure amount. In the present Embodiment, as an example, the exposure device 3 exposes the image portion with an exposure amount of 0.3 $\mu J/cm^2$ during the image forming time to form the electrostatic latent image. In contrast, as an example, in the potential difference reducing operation, the exposure device 3 lowers the surface potential by exposing substantially the entire area of the photosensitive drum 1 with respect to the longitudinal direction with an exposure amount of 0.03 $\mu J/cm^2$. After exposing, the surface potential of the photosensitive drum 1 of the transfer area C becomes the predetermined portion dark portion potential Vd (−500 V) and the surface potential of the photosensitive drum 1 of the non-transfer area D becomes −560 V. In this exposing process, the higher the surface potential before exposure is, the larger the changing amount of the surface potential after the exposure becomes. Therefore, the potential difference between the transfer area C and the non-transfer area D becomes even smaller than that in the state 6.

As described above, in the state after performing the potential difference reducing operation (state 7), the potential difference between the transfer area C and the non-transfer area D becomes smaller by 60 V, when it is compared to the state before performing the potential difference reducing operation (state 4). Thus, it is possible to reduce the potential difference between the transfer area C and the non-transfer area D by performing the potential difference reducing operation to apply the negative polarity voltage (negative bias) to the transfer roller 5 and to expose with the lower exposure amount by the exposure device 3. In other words, it is possible to equalize the surface potential of the photosensitive drum 1.

In the potential difference reducing operation, for example, the exposure with the lower exposure amount by the exposure device 3 can be started at a matched timing when a position on the photosensitive drum 1, which was positioned in the transfer portion $N_t$ at a timing when the application of the negative bias is started, reaches the exposing position Pb. In addition, for example, the exposure with the lower exposure amount by the exposure device 3 can be started after the position on the photosensitive drum 1, which was positioned in the transfer portion $N_t$ at the timing when the application of the negative bias is started, reaches the exposing portion Pb. And it is preferable to continue to rotate the photosensitive drum 1 for a sufficient amount of time so that the entire circumference of the photosensitive drum 1 passes through each of the transfer portion $N_t$, where negative bias is applied, and the exposing position Pb, which is in the state where the exposure with the lower exposure amount by the exposure device 3 is performed, at least once. Typically, it is possible for the application of the negative bias and the exposure with the lower exposure amount by the exposure device 3 to be continued from when the exposure with the lower exposure amount by the exposure device 3 is started after the application of the negative bias is started, until the photosensitive drum 1 rotates about one to ten rounds. However, the present invention is not limited to this configuration, as long as the potential difference between the transfer area C and the non-transfer area D can be sufficiently reduced. A control of the timing for performing the potential difference reducing operation is further described below.

Here, unlike the present Embodiment, it is possible to eliminate the potential difference between the transfer area C and the non-transfer area D, for example, by using a pre-exposure means or by exposing the image portion with the same high exposure amount as the exposure device 3 exposes the image forming portion in the image forming time. In this case, an amount of electric discharge to the photosensitive drum 1 in the charging process would increase. When the amount of electric discharge increases, there is a possibility that an image defect called an "image flow" becomes likely to occur. The "image flow" refers to an image defect that occurs when an electric discharge product generated during electric discharge adheres to the surface of the photosensitive drum 1 and absorbs moisture on the surface of the photosensitive drum 1, thereby preventing a normal charging of the surface of the photosensitive drum 1 and causing a decrease in image density. In recent years, the image forming apparatus 100 has been extended in service life, and it also becomes one factor for the image flow to be likely to occur that the amount of electric discharge to the photosensitive drum 1 tends to increase due to a long-term use. Thus, with methods such as using the pre-exposure means or exposing with the high exposure amount by the exposure device 3 as described above, the above "reduction of the potential difference" and the above "image flow" are in a trade-off relationship from a viewpoint of the amount of electric discharge, and it is difficult to achieve both at the same time. In contrast to this, with the potential difference reducing operation in the present Embodiment, the potential difference between the transfer area C and the non-transfer area D can be reduced while suppressing the amount of electric discharge in the charging process by applying the negative charge voltage (negative bias) to the transfer roller 5 and performing the exposure with the low exposure amount by the exposure device 3. Therefore, it is possible to reduce the potential difference between the transfer area C and the non-transfer area D while suppressing an occurrence of the image flow.

Incidentally, in the present Embodiment, an exposure by the exposure device 3 in the potential difference reducing operation is performed at each time the surface of the photosensitive drum 1 passes through the transfer portion $N_t$ and the charging portion Pa, but the present invention is not limited to this configuration. For example, the exposure by the exposure device 3 may be performed after making the potential difference between the transfer area C and the non-transfer area D smaller by making the surface of the photosensitive drum 1 pass through the transfer portion $N_t$ and charging portion Pa multiple times.

In addition, in the present Embodiment, the potential difference reducing operation is described to be performed when a transfer of the toner image to the recording material P is not performed, however, there may be a case where time duration is insufficient for the potential difference reducing operation to be performed in a sheet interval in a continuous printing. In this case, the potential difference reducing operation may be performed, by increasing the time duration of the sheet interval in the continuous printing, only when the potential difference reducing operation is necessary.

In addition, in the present Embodiment, the negative polarity voltage of −1000 V (negative bias) is applied to the transfer roller 5, however, it is possible to shorten a time required to reduce the potential difference by increasing the negative polarity voltage. Depending on the voltage applied to the transfer roller 5, time duration for performing the potential difference reducing operation (a rotation time, a number of rotations, a rotation distance, etc., of the photosensitive drum 1, where the application of the negative bias and the exposure by the exposure device 3 are performed) may be varied. In other words, as the negative bias goes larger, it is possible to shorten the performing time of the potential difference reducing operation. It is further preferable that the negative bias be a voltage that does not cause an electric discharge between the photosensitive drum 1 and the transfer roller 5.

In addition, a magnitude of the negative bias in the potential difference reducing operation or a length of the performing time of the potential difference reducing operation may be varied according to the surface potential of the photosensitive drum 1 of the non-transfer area D or the potential difference between the transfer area C and the non-transfer area D. For example, when the surface potential of the photosensitive drum 1 of the non-transfer area D is high or the potential difference between the transfer area C and the non-transfer area D is large, it is possible to increase the magnitude of the negative bias or to lengthen the performing time of the potential difference reducing operation. It may be possible to perform with a combination of these.

In addition, in the present Embodiment, the exposure amount (exposure amount per unit area) is substantially uniform with respect to the longitudinal direction of the photosensitive drum 1 in the potential difference reducing operation, however, the present invention is not limited to this configuration. For example, the exposure amount (exposure amount per unit area) to the non-transfer portion D of the end portion with respect to the longitudinal direction of the photosensitive drum 1 may be set higher than the exposure amount (exposure amount per unit area) to the transfer area C. In other words, the exposure amount to the non-transfer area D may be set higher than the exposure amount to the transfer area C.

(5) Cleaning Defect

Next, an "end portion stain", which is an example of an issue that occurs in a case where the potential difference between the transfer area C and the non-transfer area D becomes large (when the surface potential of the photosensitive drum 1 in the non-transfer area D rises excessively), will be described.

When the potential difference between the transfer area C and the non-transfer area D increases as described above, Vback, which is a potential difference between the dark portion potential of the photosensitive drum 1 (surface potential of the non-exposure portion) and the potential of the developing roller 4*a* (potential of the developing voltage), becomes larger in the non-transfer area D. In this case, a phenomenon called a "reverse fogging" may occur in the non-transfer area D, in which "opposite toner" charged with the opposite polarity to the normal charging polarity of the toner adheres to the surface of the photosensitive drum 1. In a case where the toner adhering to the surface of the photosensitive drum 1 in the non-transfer area D increases due to this "reverse fogging", the cleaning defect may occur. Then, due to this cleaning defect, there is a possibility that the "end portion stain" may occur, in which the end portion of the recording material P in a direction substantially perpendicular to the conveyance direction of the recording material P is stained by the toner.

Figure 5:
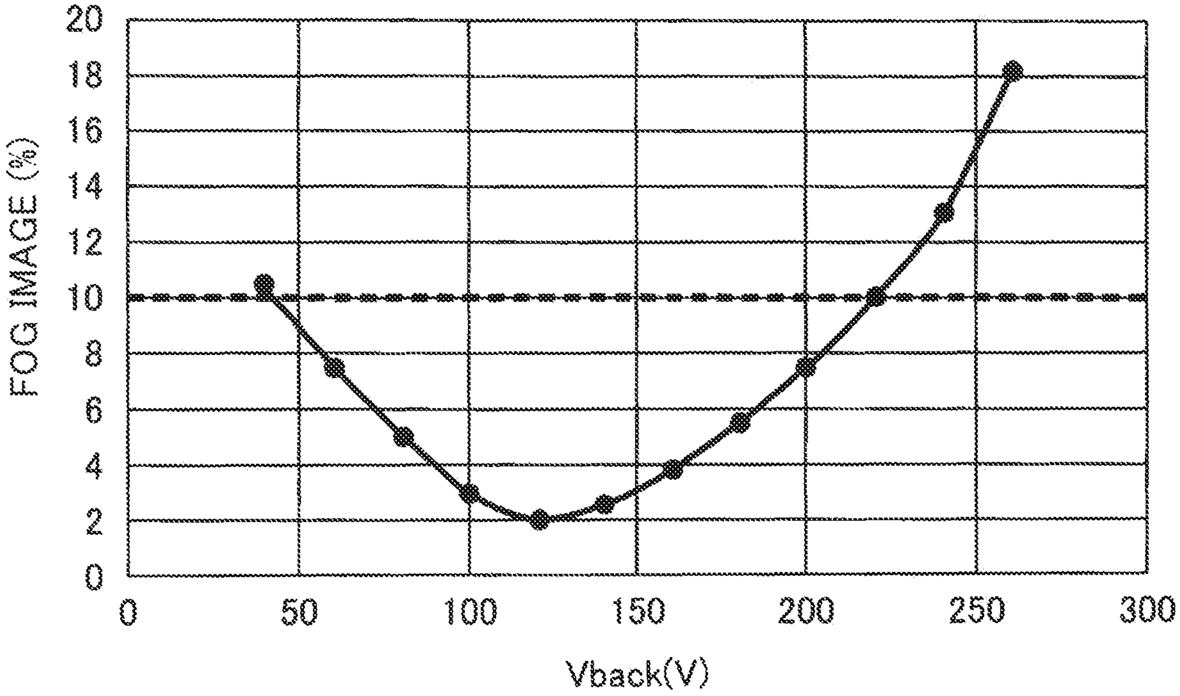
FIG. 5 is a graph illustrating a relationship between Vback and a fogging.

Here, an effect of a difference in the surface potential of the photosensitive drum 1 on a "fogging" will be described. FIG. 5 is a graph illustrating a relationship between Vback, which is the potential difference between the dark portion potential of the photosensitive drum 1 and the potential of the developing roller 4*a*, and a degree of the "fogging". Incidentally, Vback takes a positive value in a case where the dark portion potential of the photosensitive drum 1 is larger than the potential of the developing roller 4*a* on the same polarity side as the normal charging polarity of the toner.

A measurement of the "fogging" on the photosensitive drum 1 was performed as follows. The toner was collected by sticking an adhesive surface of a transparent adhesive tape onto the photosensitive drum 1. Then, the adhesive tape was attached to a piece of paper, and a density (fog density (%)) of the adhesive tape on which the toner adhered was measured to quantify the "fogging". In a case where no "fogging" occurs, the fog density is 0%, and the larger a value of the fog density takes, the greater a degree of the "fogging" becomes, which indicates that more toner is adhering to the surface of the photosensitive drum 1.

Types of the "fogging" include the following. First, a "ground fogging", in which the toner charged with the normal charging polarity adheres to the surface of the photosensitive drum 1 in a case where the potential difference between the dark portion potential of the photosensitive drum 1 and the developing roller 4*a* is small. Next, the "reverse fogging", in which the "opposite toner" charged with the opposite polarity to the normal charging polarity adheres to the surface of the photosensitive drum 1 in a case where the potential difference between the dark portion potential of the photosensitive drum 1 and the developing roller 4*a* is large.

As shown in FIG. 5, in a configuration of the present Embodiment, the fogging becomes the smallest when Vback is around 120V, and the fog density is 2%. This degree of the fogging does not cause a problem. On the other hand, when Vback becomes larger than 220V, the fogging exceeding the fog density of 10% (reverse fogging) may occur, and then the cleaning defect may occur.

To prevent the "reverse fogging" in the non-transfer area D, there are means to reduce Vback of the non-transfer area D such as by lowering the dark portion potential of the photosensitive drum 1 or by raising the potential of the developing roller 4*a*. However, if the potential is changed under a condition where the potential difference between the transfer area C and the non-transfer area D is large, Vback of the transfer area C becomes small, which in turn causes the "ground fogging" in the transfer area C. Therefore, it is preferable to reduce the potential difference between the transfer area C and the non-transfer area D.

In other words, in the configuration of the present Embodiment, it is more preferable to make Vback uniform with respect to the longitudinal direction. In addition, the charge voltage and the developing voltage may be controlled to adjust Vback after the transfer bias is set to the negative bias and the surface potential of the photosensitive drum 1 is changed to a direction in which the surface potential becomes uniform with respect to the longitudinal direction of the photosensitive drum 1.

The degree of the fogging (reverse fogging) after the initial charging (state 1), after passing through the transfer portion $N_t$ and the charging position Pa multiple times (state 4), and after performing the potential difference reducing operation (state 7) in the present Embodiment will be described using FIG. 3 and FIG. 4. In FIG. 3 and FIG. 4, a bold dotted line represents the potential of the developing roller 4*a*. The potential difference between the surface potential of the photosensitive drum 1 and the potential of the developing roller 4*a* is Vback.

First, in the state 1 (FIG. 3), the charge voltage of −1100 V is applied to the charging roller 2, and the surface potential of the photosensitive drum 1 is uniformly charged to the predetermined dark portion potential of −500 V. In addition, the developing voltage of −380 V is applied to the developing roller 4*a*. Therefore, in the transfer area C and the non-transfer area D, Vback(1) is uniformly 120V, and the fogging is not a problematic degree.

Next, in the state 4 (FIG. 3), since the surface potential of the photosensitive drum 1 in the transfer area C is the predetermined dark portion potential of −500 V, Vback(2) in the transfer area C is substantially equal to Vback(1) above, and therefore the fogging is not a problematic degree as described above. On the other hand, since the surface potential of the photosensitive drum 1 in the non-transfer area D is −620V, Vback(3) in the non-transfer area D is 240V, and the fogging exceeds the fog density of 10%, the cleaning defect may occur. Then, due to the cleaning defect, the end portion stain may occur.

Next, in the state 7 (FIG. 4), which is the state after performing the potential difference reducing operation, since the surface potential of the photosensitive drum 1 of the transfer area C is the predetermined dark portion potential of −500 V, Vback(4) in the transfer area C is substantially equal to Vback(1) above, and therefore the fogging is not a problematic degree as described above. In addition, since the surface potential of the photosensitive drum 1 of the non-transfer area D is −560 V, Vback (5) in the non-transfer area D is 180 V and the fogging does not exceed the fog density of 10%, the fogging is also not a problematic degree as described above.

Thus, by performing the potential difference reducing operation to apply the negative polarity voltage (negative bias) to the transfer roller 5 and to perform the exposure by the exposure device 3, it is possible to suppress the end portion stain caused by the occurrence of the cleaning defect due to the fogging.

In the present Embodiment, in the potential difference reducing operation, the negative polarity voltage (negative bias) is applied to the transfer roller 5 to reduce the potential difference between the transfer area C and the non-transfer area D, and then the exposure by the exposure device 3 is performed. By this, the fogging which causes the cleaning defect is improved by making the surface potential of the photosensitive drum 1 closer to the predetermined dark portion potential substantially in the entire area with respect to the longitudinal direction and thereby making Vback closer to 120V The fogging which causes the cleaning defect may also be improved by making the voltage applied to the charging roller 2 lower or making the voltage applied to the developing roller 4*a* higher after applying the negative polarity voltage to the transfer roller 5 and thereby making Vback closer to 120V.

(6) Operating Procedure

Figure 6:
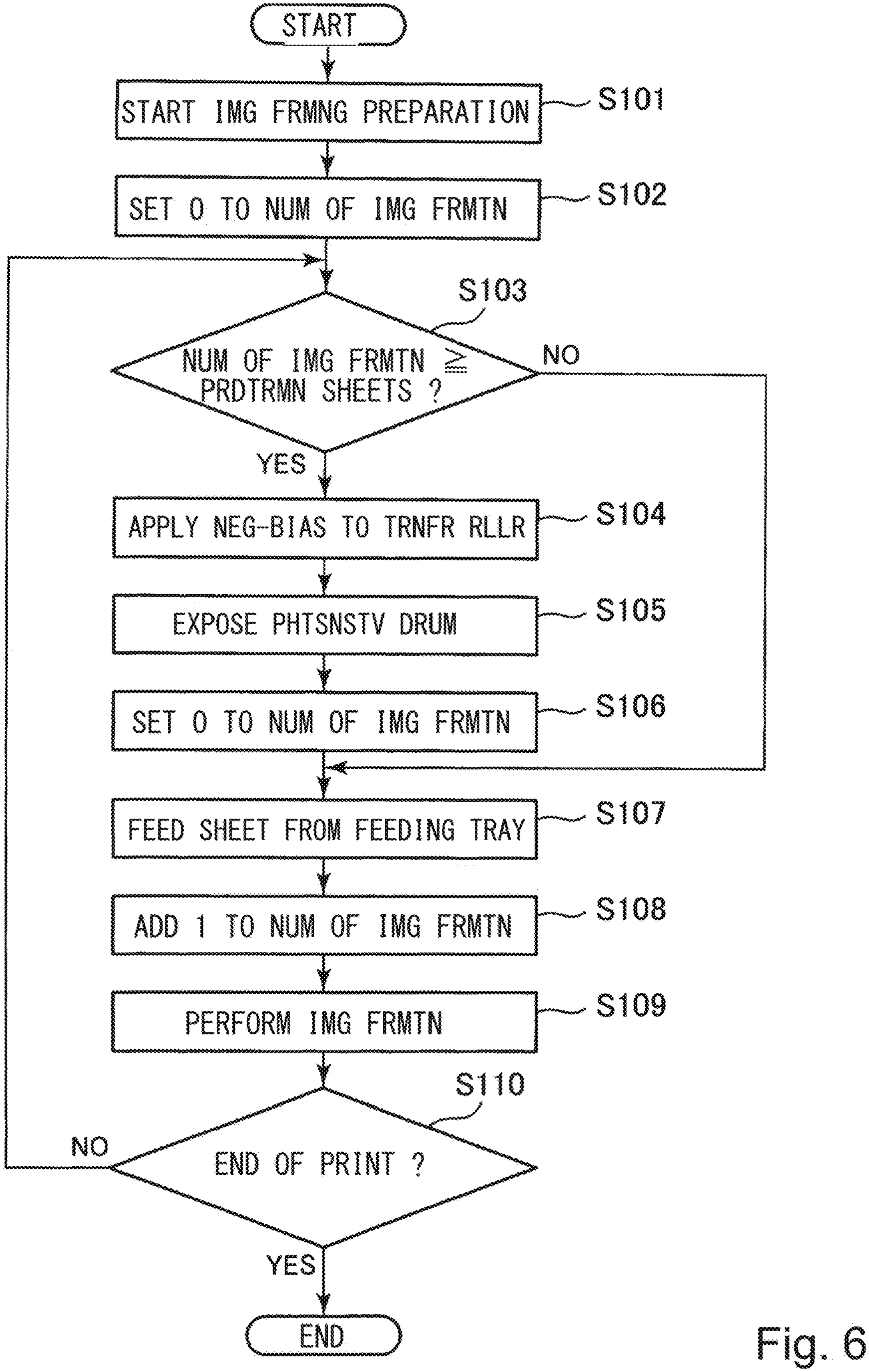
FIG. 6 is a flow chart of a control of an Embodiment 1.

FIG. 6 is a flow chart illustrating an outline of a procedure of a print job in the present Embodiment. A process in FIG. 6 is executed by the control portion 40 (more precisely, the CPU 41) when the image forming apparatus 100 is started upon receiving the print job information. In the present Embodiment, a control of the execution of the potential difference reducing operation is performed based on information on a history of paper passing of the recording material P.

First, the control portion 40 receives the print job information and executes an image forming preparation (S101). More specifically, the control portion 40 drives motors to drive various rotating members (such as the photosensitive drum 1 and various rollers) inside the image forming apparatus 100, and also supplies electrical power to the heater of the fixing device 12 to perform a pre-heating of the fixing device 12. Next, the control portion 40 sets a count value of a number of sheets on which the image is formed in a counter (number of sheets counter, sequence counter) disposed in the RAM 41*b* in the present Embodiment to an initial value (0 in the present Embodiment) (S102). In the present Embodiment, the control portion 40 adds 1 to the count value of the number of sheets on which the image is formed in the RAM 41*b*, updates the count value subsequently at each time when an image is formed on one side of the recording material P (each time when the recording material P is supplied to the transfer portion $N_t$), and stores the updated count value in the RAM 41*b*. Next, the control portion 40 determines whether the count value of the number of sheets on which the image is formed in the RAM 41*b* is equal to or more than a predetermined value (threshold value) (S103). If the control portion 40 determines that the count value of the number of sheets on which the image is formed is less than the predetermined value ("No") in S103, then the control portion 40 proceeds to a process of S107. In addition, if the control portion 40 determines that the count value of the number of sheets on which the image is formed is equal to or more than the predetermined value ("Yes") in the S103, then the control portion 40 temporarily stops conveying the recording material P, goes through processes from S104 to S106, and proceeds to the process of the S107. In other words, the control portion 40 applies the negative polarity voltage (negative bias) to the transfer roller 5 (S104), performs the exposure to the photosensitive drum 1 by the exposure device 3 (S105), sets the count value of the number of sheets on which the image is formed in the RAM 41*b* to the initial value (0 in the present Embodiment) again (S106), and proceeds to the process of the S107. Here, a threshold value for the number of sheets on which the image is formed based on which the potential difference reducing operation is performed may be determined by how the surface potential of the photosensitive drum 1 in the non-transfer area D rises, and may be changed according to information such as the configuration of the image forming apparatus 100, a use environment, and a total usage history of the image forming apparatus 100.

Then, the control portion 40, after conveying the recording material P to the transfer portion $N_t$ (S107), performs an addition of one to the count value of the number of sheets on which the image is formed in the RAM 41*b* (S108). Next, the control portion 40 performs the image forming operation under a specified image forming condition (S109). Next, the control portion 40 determines whether or not outputs of all images specified in the print job are completed (S110), and if the control portion 40 determines that it is not completed ("No"), then the control portion 40 returns to the process of S103, and if the control portion 40 determines that it is completed ("Yes"), then the control portion 40 terminates the print job.

(7) Effect

Next, results of evaluation tests showing an effect of the present Embodiment will be described. Here, an evaluation of the fogging (reverse fogging) in the non-transfer area D is performed by using the image forming apparatus 100 of the configuration of the present Embodiment and by performing a continuous image forming to 200 sheets under a normal temperature and a normal humidity (23° C./50% RH) environment. As the recording material P, a paper of LTR size with a basis weight of 75 g/m$^2$ is used. In addition, the threshold for the number of sheets on which the image is formed to perform the potential difference reducing operation is set as 50 sheets.

Table 1 shows the results of the evaluations in cases where the image forming was performed from the first sheet to the 200th sheet with the image forming apparatus 100 of the present Embodiment and with the image forming apparatus 100 of a Comparative Example 1. The configuration and operation of the image forming apparatus 100 of the Comparative Example 1 are substantially the same as those of the image forming apparatus 100 of the present Embodiment, except that the control of the execution of the potential difference reducing operation is different, as described below Incidentally, also in the Comparative Example 1, elements having functions or configurations that are the same as or corresponding to the present Embodiment will be described with the same reference numerals as the present Embodiment being labeled. In Table 1, with respect to the fogging, in a case where the value of the fog density in the non-transfer area D is less than 10%, a result is shown as "○ (good)", and in a case where the value of the fog density in the non-transfer area D is equal to or more than 10%, the result is shown as "x (not good)".

TABLE 1

| Configuration | 50th sheet | 100th sheet | 150th sheet | 200th sheet |
|---|---|---|---|---|
| Embodiment 1 | ○ | ○ | ○ | ○ |
| Comp Exam 1 | ○ | X | X | X |

The Comparative Example 1 is an example in which the image forming is performed without performing the potential difference reducing operation. In this case, when the continuous image forming is performed, the potential difference between the transfer area C and the non-transfer area D gradually increases. As a result, Vback becomes larger in the non-transfer area D, the fogging may worsen and the cleaning defect may occur.

On the other hand, in the present Embodiment, the potential difference reducing operation is performed at each time when the number of sheets on which the image is formed becomes 50 based on the history of paper passing of the recording material P. In this case, when the continuous image forming is performed, the potential difference between the transfer area C and the non-transfer area D is reset at each time when the number of sheets on which the image is formed becomes 50. By this, since a rise of Vback in the non-transfer area D is suppressed, the occurrence of the cleaning defect is suppressed.

Incidentally, in the present Embodiment, the control of the execution of the potential difference reducing operation is performed based on the history of paper passing of the recording material P, however, the present invention is not limited to this configuration. Any index value may be used for the control of the execution of the potential difference reducing operation as far as the index value is capable of estimating the surface potential of the photosensitive drum 1 in the non-transfer area D (or a change thereof) or the potential difference between the transfer area C and the non-transfer area D (or a change thereof). This index value may be considered as an index value correlating with time duration when the charging process of the photosensitive drum 1 is performed. For example, the rotation time of the photosensitive drum 1, the number of rotations of the photosensitive drum 1, or the rotation distance of the photosensitive drum 1 may be measured by a measuring means (counter) provided in the image forming apparatus 100, and the control of the execution of the potential difference reducing operation may be performed based on the measured value. For example, the potential difference reducing operation may be performed when the value measured by the above measuring means becomes equal to or more than a predetermined value. In addition, the control of the execution of the potential difference reducing operation may be performed, for example, based on a result of measuring the surface potential of the photosensitive drum 1 in real time by a measuring means (measuring instrument) provided in the image forming apparatus 100. For example, the potential difference reducing operation may be performed when a value of the surface potential of the photosensitive drum 1 of the non-transfer area D measured by the above measuring means or a value of the potential difference between the transfer area C and the non-transfer area D measured by the above measuring means becomes equal to or more than a predetermined threshold value.

In addition, in the present Embodiment, a performing timing of the potential difference reducing operation is determined based on the potential difference between the transfer area C and the non-transfer area D, where there is a possibility that the fogging may occur beyond an acceptable degree. Therefore, the performing timing of the potential difference reducing operation may be changed according to a condition of the occurrence of the fogging. That is, in a case where the image forming apparatus 100 is used in a low temperature and low humidity environment where the fogging is likely to occur, or in a case where the cartridge is at an end of life, where a ratio of the opposite toner within the toner in the developing container 4*b* tends to increase, the following may be performed. In other words, the performing timing of the potential difference reducing operation may be set earlier, i.e., a performing frequency of the potential difference reducing operation may be increased. Alternatively, the performing time of the potential difference reducing operation may be set longer. For example, an environment sensor (such as a temperature/humidity sensor) is provided in the image forming apparatus 100 as an environment detection means for detecting the environment (at least one of temperature or humidity at least one of inside or outside the image forming apparatus 100). And then, it is possible to control so that the performing frequency of the potential difference reducing operation is increased (e.g., setting a threshold value for the above number of sheets on which the image is formed smaller) as an absolute moisture content (or temperature or humidity) which a detection result of the environment sensor indicates becomes smaller. It may also be configured so that the performing frequency of the potential difference reducing operation is changed in a case where the absolute moisture content (or temperature or humidity) which the detection result of the environment sensor indicates becomes smaller than a predetermined threshold value. In addition, a storage portion (e.g., such as a nonvolatile memory which the cartridge or the apparatus main body includes) is provided for storing a usage history of the cartridge. And then, it is possible to control so that the performing frequency of the potential difference reducing operation is increased (e.g., setting the threshold value of the above number of sheets on which the image is formed smaller) as a remaining life of the cartridge becomes shorter. It may also be configured so that the performing frequency of the potential difference reducing operation may be changed when the remaining life of the cartridge becomes less than a predetermined threshold value. Incidentally, the life of the cartridge can be calculated based on detecting, for example, a usage amount of the photosensitive drum 1 (rotation time, number of rotations, rotation distance, etc.), a residual amount of the toner in the developing container 4*b*, etc., by a detection means.

Thus, it is possible for the control portion 40 to change the performing frequency of the potential difference reducing operation correlating with the number of sheets of the recording material P on which the toner image is transferred from performing the potential difference reducing operation until performing the potential difference reducing operation next. In addition, it is possible for the control portion 40 to change the performing time of the potential difference reducing operation correlating with the rotation time of the photosensitive drum 1 in the potential difference reducing operation.

Thus, in the present Embodiment, the image forming apparatus 100 comprises the rotatable photosensitive member (drum) 1, the rotatable charging member 2 configured to form the charging portion B in contact with the photosensitive member 1 and to charge the surface of the photosensitive member 1 at the charging portion B, the exposure device 3 configured to expose the surface of the photosensitive member 1, charged by the charging member 2, by a first exposure amount and to form the electrostatic image on the surface of the photosensitive member 1, the developing member 4*a* configured to form the developing portion E in contact with the surface of the photosensitive member 1 and to form the toner image by supplying the toner charged with the normal polarity to the electrostatic image formed on the surface of the photosensitive member 1 at the developing portion E, the transfer member 5 configured to form the transfer portion in contact with the surface of the photosensitive member 1 and to transfer the toner image to the recording material P from the surface of the photosensitive member 1 at the transfer portion $N_t$ by application of the transfer voltage having the opposite polarity to the normal polarity, the transfer power source 18 configured to apply a voltage to the transfer member 5, and the control portion 40 configured to control the exposure device 3 and the transfer power source 18, and in the rotational axis direction of the charging member 2, the width of the transfer portion $N_t$ is shorter than the width of the developing portion E, the width of the transfer portion $N_t$ is shorter than the width of the charging portion B and the end portion of the surface of the photosensitive member in the rotational axis direction includes the non-transfer area D in contact with the charging member 2 and not in contact with the transfer member 5. In the present Embodiment, it is possible for the control portion 40 to control to cause the transfer power source 18 to apply the voltage having the normal polarity to the transfer member 5 when no recording material P exists at the transfer portion $N_t$, and to perform the operation in which the exposure device 3 exposes an area, including the non-transfer area D of the surface of the photosensitive member 1 that has passed through the transfer portion $N_t$ during application of the voltage, by a second exposure amount smaller than the above first exposure amount. In the present Embodiment, the control portion 40 controls the exposure device 3 in the above operation so as to expose the area including the transfer area C in contact with the transfer member 5 on the surface of the photosensitive member 1 and the non-transfer area D. Incidentally, it is possible for the control portion 40 to control the exposure device 3 in the above operation such that the exposure amount to the non-transfer area D by the exposure device 3 is equal to or more than the exposure amount to the transfer area C by the exposure device 3. In addition, in the present Embodiment, the control portion 40 controls the transfer power source 18 in the above operation so as to apply a voltage, having the normal polarity, of which an absolute value is larger than the surface potential of the photosensitive member 1 at the transfer portion $N_t$ to the transfer member 5. In addition, in the present Embodiment, the control portion 40 controls the transfer power source 18 in the above operation so as to apply a voltage, having the normal polarity, which causes the potential difference between the photosensitive member 1 and the transfer member 5 to become equal to or less than the electric discharge threshold to the transfer member 5. Here, it is possible for the control portion 40 to perform the above operation based on an index value correlating with the time duration when the charging process of the photosensitive member 1 is performed. The above index value may include the history of paper passing of the recording material P, the rotation time of the photosensitive member 1, the number of rotations of the photosensitive member 1, or the rotation distance of the photosensitive member 1. In addition, it is possible for the control portion 40 to perform the above operation based on the surface potential of the photosensitive member 1 of the non-transfer area D. In this case, it is possible for the control portion 40 to perform the above operation based on the potential difference between the surface potential of the photosensitive member 1 of the non-transfer area D and the surface potential of the photosensitive member 1 of the transfer area C in contact with the transfer member 5 in the surface of the photosensitive member 1.

As described above, according to the present Embodiment, by executing the potential difference reducing operation, it is possible to suppress the excessive rise of the surface potential of the photosensitive drum 1 of the non-transfer area E. Thus, according to the present Embodiment, it is possible to suppress the excessive rise of the surface potential of the end portion with respect to the longitudinal direction of the photosensitive drum 1 (non-transfer area D) in a configuration where a contact area C of the surface of the photosensitive drum 1 in contact with the transfer roller 5 is shorter than a contact area B of the surface of the photosensitive drum 1 in contact with the charging roller 2 with respect to the longitudinal direction. By this, it is possible to suppress the end portion stain caused by the occurrence of the cleaning defect due to the fogging.

Incidentally, in the present Embodiment, the end portion stain caused by the occurrence of the cleaning defect due to the fogging is described, as an example of a problem in the case where the surface potential of the photosensitive drum 1 of the non-transfer area D rises excessively. As mentioned above, another example of the problem in the case where the surface potential of the photosensitive drum 1 of the non-transfer area D rises excessively is an occurrence of a charging defect (streak image) due to damage of the surface of the photosensitive drum 1 caused by electric discharge between the photosensitive drum 1 and a core metal portion of the transfer roller 5. According to the present Embodiment, the suppression effect for other issues in the case where the surface potential of the photosensitive drum 1 of the non-transfer area D rises excessively can also be expected in the same manner.

Next, Embodiment 2 of the present invention will be described. A basic configuration and an operation of the image forming apparatus of the present Embodiment are the same as those of the Embodiment 1. Therefore, in the image forming apparatus of the present Embodiment, with respect to elements having functions or configurations that are the same as or corresponding to the image forming apparatus of the Embodiment 1 will be labeled with the same reference numerals as the Embodiment 1, and detailed explanations will be omitted.

In the present Embodiment, the performance of the potential difference reducing operation is controlled based on the history of paper passing of the recording material P. In the present Embodiment, the image forming apparatus 100 can change the transfer voltage of the positive polarity applied to the transfer roller 5 during transfer (during the image forming time) based on information about an image pattern detected by an image detection means. And, in the present Embodiment, in a case where the transfer voltage of the positive polarity applied to the transfer roller 5 during transfer is lowered, the image forming apparatus 100 reduces the performing frequency of the potential difference reducing operation (or reduces the performing time of the potential difference reducing operation) to improve productivity.

Here, an effect of the image pattern to be formed on the potential difference between the transfer area C and the non-transfer area D will be described. A required amount of the transfer voltage of the positive polarity applied to the transfer roller 5 during transfer is determined by the image pattern to be formed. For example, in a case, such as an all-black image, where an amount of the toner to be transferred is high, a required transfer voltage becomes larger, and in a case, such as text, where the amount of the toner to be transferred is low, the required transfer voltage becomes smaller.

On the other hand, the potential difference between the transfer area C and the non-transfer area D is determined by the application of the transfer voltage of the positive polarity to the transfer area C. This is because a way of decreasing of the surface potential of the photosensitive drum 1 of the transfer area C after transfer changes according to a magnitude of the transfer voltage of the positive polarity applied to the transfer roller 5 during transfer. In a case where the transfer voltage of the positive polarity applied to the transfer roller 5 during transfer is small, the above potential difference becomes small, and in a case where the transfer voltage of the positive polarity applied to the transfer roller 5 during transfer is large, the above potential difference becomes large.

In other words, in a case where the image pattern to be formed is an image pattern with a low print ratio (image ratio, image duty), such as a text image, the transfer voltage of the positive polarity applied to the transfer roller 5 during transfer can be set smaller. And, in a case where the transfer voltage of the positive polarity applied to the transfer roller 5 during transfer is set smaller, the potential difference between the transfer area C and the non-transfer area D becomes smaller. Therefore, the performing timing of the potential difference reducing operation can be delayed, i.e., the performing frequency of the potential difference reducing operation can be reduced. Alternatively, the performing time of the potential difference reducing operation can be shortened.

Next, the image detection means will be described. The image detection means is a device that analyzes image information input to the image forming apparatus 100 from the external device 200. In the present Embodiment, the video controller 110, as the image detection means, detects the print ratio of the image pattern to be formed. In the present Embodiment, the video controller 110 detects the print ratio per each image to be formed on one sheet of the recording material P and inputs information indicating the result (print ratio information) to the control portion 40. Incidentally, the print ratio can be expressed as a proportion (%) of pixels in which the toner image is formed out of all pixels of the image forming area. Based on the print ratio information detected by the video controller 110, the control portion 40 determines that it is a low print ratio when the print ratio is equal to or less than a predetermined threshold value, and changes (reduces) the transfer voltage applied to the transfer roller 5 during transfer. In the present Embodiment, the threshold value of the above print ratio is set to 5%. In other words, the control portion 40 determines that it is the low print ratio when the print ratio is equal to or less than 5%, and changes (reduces) the transfer voltage applied to the transfer roller 5 during transfer.

Figure 7:
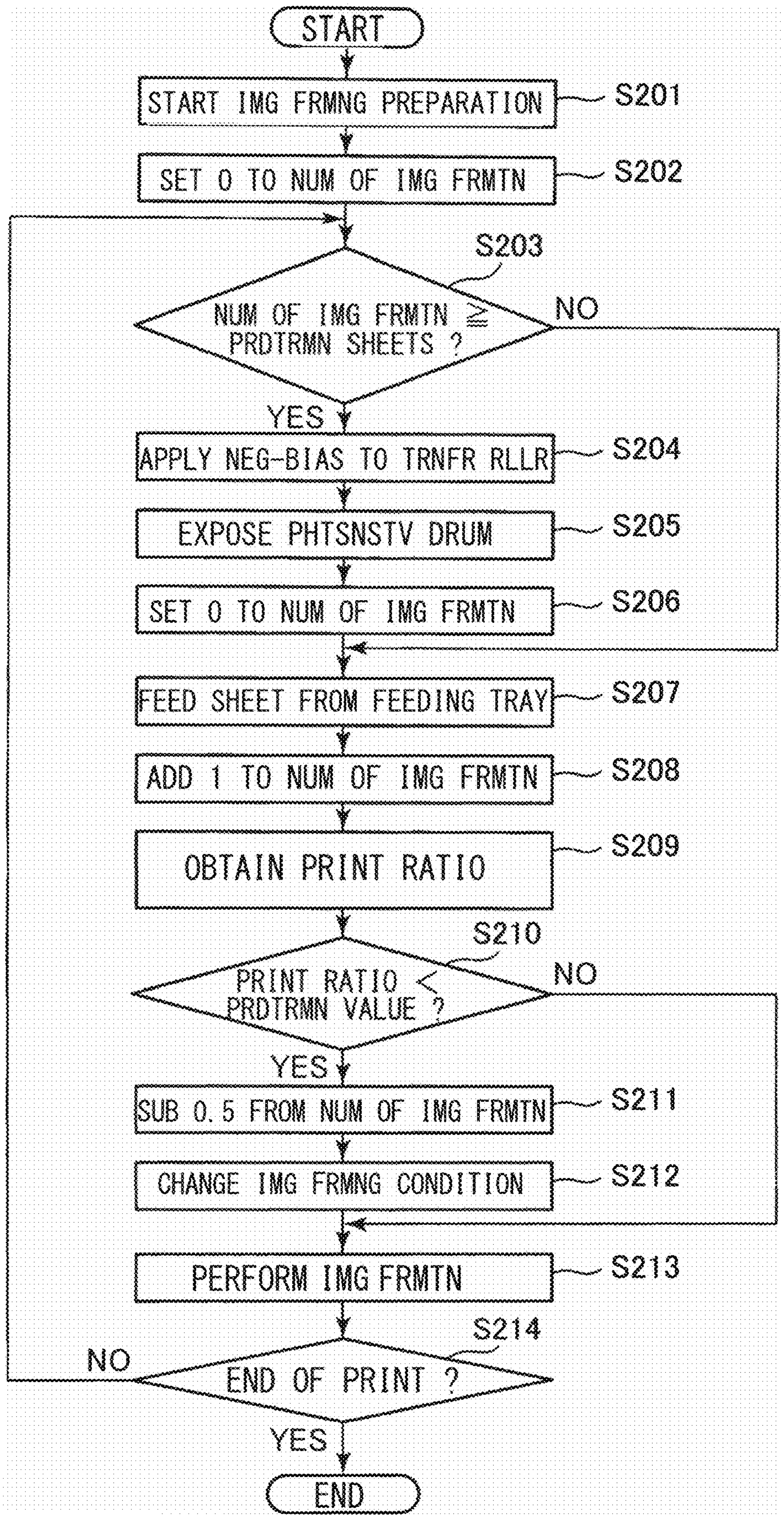
FIG. 7 is a flow chart of a control of an Embodiment 2.

FIG. 7 is a flow chart illustrating an outline of a procedure of the print job in the present Embodiment. A process in FIG. 7 is executed by the control portion 40 (more specifically, the CPU 41) when the image forming apparatus 100 is started upon receiving the print job information. In the present Embodiment, based on the print ratio information of the image to be formed, the image forming condition is changed and the performing timing of the potential difference reducing operation is changed.

First, the control portion 40 receives the print job information and executes an image forming preparation (S201).

More specifically, the control portion 40 drives motors to drive various rotating members (such as the photosensitive drum 1 and various rollers) inside the image forming apparatus 100, and also supplies electrical power to the heater of the fixing device 12 to perform the pre-heating of the fixing device 12. Next, the control portion 40 sets the count value of the number of sheets on which the image is formed in the counter (number of sheets counter, sequence counter) disposed in the RAM 41*b* in the present Embodiment to an initial value (0 in the present Embodiment) (S202). In the present Embodiment, the control portion 40 adds 1 to the count value of the number of sheets on which the image is formed in the RAM 41*b*, updates the count value subsequently at each time when an image is formed on one side of the recording material P (each time when the recording material P is supplied to the transfer portion $N_t$), and stores the updated count value in the RAM 41*b*. Next, the control portion 40 determines whether the count value of the number of sheets on which the image is formed in the RAM 41*b* is equal to or more than a predetermined value (threshold value) (S203). If the control portion 40 determines that the count value of the number of sheets on which the image is formed is less than the predetermined value ("No") in S203, then the control portion 40 proceeds to a process of S207. In addition, if the control portion 40 determines that the count value of the number of sheets on which the image is formed is equal to or more than the predetermined value ("Yes") in the S203, then the control portion 40 temporarily stops conveying the recording material P, goes through processes from S204 to S206, and proceeds to the process of S207. In other words, the control portion 40 applies the negative polarity voltage (negative bias) to the transfer roller 5 (S204), performs the exposure to the photosensitive drum 1 by the exposure device 3 (S205), sets the count value of the number of sheets on which the image is formed in the RAM 41*b* to the initial value (0 in the present Embodiment) again (S206), and proceeds to the process of S207.

Then, the control portion 40, after conveying the recording material P to the transfer portion $N_t$ (S207), performs an addition of one to the count value of the number of sheets on which the image is formed in the RAM 41*b* (S208). Next, the control portion 40 obtains the print ratio information of the image detected by the video controller 110 (S209). Next, the control portion 40 determines whether or not the print ratio of the image is less than the predetermined value (S210). If the control portion 40 determines that the print ratio is equal to or more than the predetermined value ("No") in S210, then the control portion 40 proceeds to a process of S213. In addition, if the control portion 40 determines that the print ratio is less than the predetermined value ("Yes") in S210, then the control portion 40 goes through processes of S211 and S212, and proceeds to the process of S213. In other words, the control portion 40 subtracts 0.5 from the count value of the number of sheets on which the image is formed in the RAM 41*b* (S211). In addition, the control portion 40 changes the image forming condition so that the transfer voltage applied to the transfer roller 5 during transfer is lowered to a value corresponding to an image with the low print ratio, which is set in advance (S212). Then, the control portion 40 proceeds to the process of S213.

Next, the control portion 40 performs the image forming operation under a specified image forming condition (S213). Next, the control portion 40 determines whether or not outputs of all images specified in the print job are completed (S214), and if the control portion 40 determines that it is not completed ("No"), then the control portion 40 returns to the process of S203, and if the control portion 40 determines that it is completed ("Yes"), then the control portion 40 terminates the print job.

Next, results of evaluation tests showing an effect of the present Embodiment will be described. Here, an evaluation of the fogging (reverse fogging) in the non-transfer area D is performed by using the image forming apparatus 100 of the configuration of the present Embodiment and by performing a continuous image forming to 200 sheets under a normal temperature and a normal humidity (23° C./50% RH) environment. As an image to be formed, an image with the low print ratio of 1% is used. In addition, as the recording material P, a paper of LTR size with a basis weight of 75 g/m2 was used. In addition, the threshold for the number of sheets on which the image is formed to perform the potential difference reducing operation is set as 50 sheets.

Table 2 shows the results of the evaluations in cases where the image forming was performed from the first sheet to the 200th sheet with the image forming apparatus 100 of the present Embodiment and with the image forming apparatus 100 of a Comparative Example 2. The configuration and operation of the image forming apparatus 100 of the Comparative Example 2 are substantially the same as those of the image forming apparatus 100 of the present Embodiment, except that the control of the execution of the potential difference reducing operation is different, as described below Incidentally, also in the Comparative Example 2, elements having functions or configurations that are the same as or corresponding to the present Embodiment will be described with the same reference numerals as the present Embodiment being labeled. In Table 2, with respect to the fogging, in a case where the value of the fog density in the non-transfer area D is less than 10%, a result is shown as "○ (good)", and in a case where the value of the fog density in the non-transfer area D is equal to or more than 10%, the result is shown as "x (not good)". In addition, in Table 2, the count value of the number of sheets on which the image is formed by the counter at a time of each actual number of sheets on which the image is formed and whether or not the potential difference reducing operation is performed immediately after the image forming are also shown.

TABLE 2

| | Configuration | | | | | | | |
|---|---|---|---|---|---|---|---|---|
| | 50th sheet | | 100th sheet | | 150th sheet | | 200th sheet | |
| | Fog | Counter | Fog | Counter | Fog | Counter | Fog | Counter |
| Embodiment 2 | ○ | 25 | ○ | 50 Performed | ○ | 25 | ○ | 50 Performed |
| Comp Exam 2 | ○ | 50 Performed | ○ | 50 Performed | ○ | 50 Performed | ○ | 50 Performed |

The Comparative Example 2 is an example in which the image forming is performed without changing the control (i.e., without reducing the performing frequency of the potential difference reducing operation) even in a case of an image with the low print ratio, while the potential difference reducing operation is performed based on the history of paper passing of the recording material P. In this case, when the continuous image forming is performed, the potential difference reducing operation is performed at each time when the number of sheets on which the image is formed becomes 50, therefore while there is no problem with the fogging, the potential difference reducing operation is performed four times during 200 sheets of the image forming.

On the other hand, in the present Embodiment 2, in a case where the print ratio is equal to or less than 5%, an image to be formed is determined to be an image with the low print ratio, therefore the image to be formed in the evaluation test is determined to be the image with the low print ratio. Then, in the present Embodiment, in a case where the image to be formed is an image with the low print ratio, the transfer voltage applied to the transfer roller 5 during transfer is reduced, and the count value of the number of sheets on which the image is formed by the counter is subtracted by 0.5. Therefore, in the present Embodiment, it is only twice when the potential difference reducing operation is performed, which is after the image forming of 100th sheet and after the image forming of 200th. Therefore, according to the present Embodiment, a number of performing the potential difference reducing operation can be reduced compared to the Comparative Example 2, while keeping the fogging at a non-problematic level, thereby improving productivity.

Incidentally, in the present Embodiment, based on the print ratio information of the image, the image forming conditions are changed and the performing frequency of the potential difference reducing operation is changed, however, the present invention is not limited to this configuration. Instead of the performing frequency of the potential difference reducing operation, at least one of the conditions, such as the performing time in one time of the potential difference reducing operation and the voltage (negative bias) applied to the transfer roller 5 in the potential difference reducing operation, may be changed. For example, instead of reducing the performing frequency of the potential difference reducing operation, the performing time of the potential difference reducing operation may be reduced as described above. In addition, for example, instead of reducing the performing frequency of the potential difference reducing operation, the voltage (negative bias) applied to the transfer roller 5 or the exposure amount by the exposure device 3 in the potential difference reducing operation may be reduced. Two or more of the performing frequency of the potential difference reducing operation, the performing time of the potential difference reducing operation, and the conditions (transfer voltage or exposure amount) in the potential difference reducing operation may be changed in combination.

In addition, in the present Embodiment, in a case where the image to be formed is determined to be an image with the low print ratio, the count value of the number of sheets on which the image is formed counted by the counter is subtracted by 0.5; however, the present invention is not limited to this configuration. A changing amount of the transfer voltage during transfer in a case of the low print ratio compared to the transfer voltage during transfer in a case of the high print ratio depends on the configuration of the image forming apparatus 100, etc. Therefore, the subtraction value of the count value of the number of sheets on which the image is formed by the counter may also be changed according to the configuration of the image forming apparatus 100, etc.

In addition, the transfer voltage during transfer may be changed in a plurality of levels according to the print ratio information of the image to be formed, and the performing frequency and the performing time of the potential difference reducing operation may be changed in a plurality of levels accordingly.

In addition, in the present Embodiment, the determination as to whether or not the image to be formed is the image with the low print ratio is performed for each image; however, the present invention is not limited to this configuration. For example, an image may be divided into a plurality of regions (e.g., into a plurality of regions with respect to the conveyance direction of the recording material P), and a detection of the print ratio may be performed onto the images of each region. And the transfer voltage during transfer may be changed according to the print ratio of the images of each region, and the subtraction value of the count value of the number of sheets on which the image is formed by the counter (i.e., the performing frequency and the performing time of the potential difference reducing operation) may be changed accordingly. In addition, for example, the image forming conditions and the performing frequency and the performing time of the potential difference reducing operation may be changed based on an average value of the print ratios of plural sheets of images.

In addition, in the present Embodiment, the print ratio information is used as information regarding the image pattern to be formed; however, any index value may be used in the same manner as long as the index value correlates with the toner amount of the image to be formed. For example, a pixel count value, which is an integrated value of density information for each pixel, may be used.

Thus, it is possible for the control portion 40 to change the performing frequency of the above operation correlating with the number of the recording materials P on which the toner image is transferred from performing the above operation until performing the above operation next. It is possible for the control portion 40 to change the above performing frequency based on the environment or the usage history of the image forming apparatus 100. In addition, it is possible for the control portion 40 to change the performing frequency based on the image information of the toner image formed from performing the above operation until performing the above operation next. In this case, it is possible for the control portion 40 to change the transfer voltage during transfer of the toner image based on the image information. In addition, the above image information may be the print ratio information. And it is possible for the control portion 40 to control so as to reduce the performing frequency in a case in which the print ratio information is smaller than a predetermined threshold value. In addition, it is possible for the control portion 40 to change the performing time of the above operation correlating with the rotation time of the photosensitive member 1 in the above operation. It is possible for the control portion 40 to change the performing time based on the environment or the usage history of the image forming apparatus 100. In addition, it is possible for the control portion 40 to change the performing time based on the image information of the toner image formed from performing the above operation until performing the above operation next. In this case, it is possible for the control portion 40 to change the transfer voltage during transfer of the toner image based on the image information. In addition, the above image information may be the print ratio information. And it is possible for the control portion 40 to control so as to shorten the performing time in a case in which the print ratio information is smaller than a predetermined threshold value.

As explained above, according to the present Embodiment, it is possible to obtain the same effect as the Embodiment 1 and to suppress a lowering in productivity.

As described above, the present invention is described according to the specific Embodiments, however, the present invention is not limited to the above Embodiments.

In the above Embodiments, the case in which the transfer member is a transfer roller is described, however, the transfer member is not limited to the transfer roller. The transfer member may be, for example, configured to include a rotatable endless belt in contact with the photosensitive member. On an inner circumferential surface side of this transfer belt, a voltage applying member (roller, brush, sheet, etc.) that supplies the transfer voltage to the transfer portion through the transfer belt may be provided in a position opposite to the photosensitive member. In addition, the transfer member is not limited to a rotating member, but may be of other forms such as a pad-shaped member, a sheet (film) member, or a fixed brush member.

In addition, in the above Embodiments, the case in which the photosensitive member is the photosensitive drum is described, however, the photosensitive member is not limited to the photosensitive drum. The photosensitive member may be a photosensitive belt configured in a form of an endless belt.

In addition, in the above Embodiments, the pre-exposure means is not provided in the image forming apparatus. As mentioned above, the phenomenon, in which the surface potential of the non-transfer area in the end portion of the photosensitive member with respect to the longitudinal direction rises to the excessive potential, tends to be more significant when the image forming apparatus employs the pre-exposureless method. Therefore, it can be said that the present invention is particularly effective when the image forming apparatus employs the pre-exposureless method. However, the present invention is not limited to such a configuration. The present invention can also be applied to the image forming apparatus provided with the pre-exposure means. In this case, by applying the present invention, an effect of reducing an electric discharge amount in the charging process by reducing the exposure amount of the pre-exposure means can be obtained as well as the effects described in the above Embodiments. Similarly, it can be said that the present invention is particularly effective in a case where a DC charging method is employed, however, the present invention can also be applied in a case where an AC/DC charging method is employed.

In addition, as in the above Embodiments, in the configuration where the transfer area is shorter than the developing area with respect to the longitudinal direction, there is an effect of downsizing the image forming apparatus, however, the present invention is not limited to such a configuration. The present invention can also be applied to a configuration in which the length of the transfer area is longer than the length of the developing area with respect to the longitudinal direction, and effects such as suppressing damage to the photosensitive member as described above can be obtained.

According to the present invention, in the configuration in which the contact area of the surface of the photosensitive member in contact with the transfer member is shorter than the contact area of the surface of the photosensitive member in contact with the charging member with respect to the longitudinal direction, it is possible to suppress the excessive rise of the surface potential of the end portion in the longitudinal direction of the photosensitive member.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-112087, filed Jul. 12, 2022, which is hereby incorporated by reference herein in its entirety.

What is claimed is:

1. An image forming apparatus comprising:

a rotatable photosensitive member;

a rotatable charging member configured to form a charging portion in contact with the photosensitive member and to charge a surface of the photosensitive member at the charging portion;

an exposure unit configured to expose the surface of the photosensitive member, charged by the charging member, by a first exposure amount and to form an electrostatic image on the surface of the photosensitive member;

a developing member configured to form a developing portion in contact with the surface of the photosensitive member and to form a toner image by supplying toner charged with a normal polarity to the electrostatic image formed on the surface of the photosensitive member at the developing portion;

a transfer member configured to form a transfer portion in contact with the surface of the photosensitive member and to transfer the toner image to a recording material from the surface of the photosensitive member at the transfer portion by application of a transfer voltage having an opposite polarity to the normal polarity;

a transfer power source configured to apply a voltage to the transfer member; and a control portion configured to control the exposure unit and the transfer power source, wherein in a rotational axis direction of the charging member, a width of the transfer portion is shorter than a width of the developing portion, a width of the transfer portion is shorter than a width of the charging portion and an end portion of the surface of the photosensitive member in the rotational axis direction includes a non-transfer area in contact with the charging member and not in contact with the transfer member, wherein the control portion controls to cause the transfer power source to apply the voltage having the normal polarity to the transfer member when no recording material exists at the transfer portion, and to perform a first operation in which the exposure unit exposes an area, including the non-transfer area of the surface of the photosensitive member that has passed through the transfer portion during application of the voltage, by a second exposure amount less than the first exposure amount.

2. An image forming apparatus according to claim 1, wherein the control portion controls the exposure unit in the first operation so as to expose an area including a transfer area in contact with the transfer member in the surface of the photosensitive member and the non-transfer area.

3. An image forming apparatus according to claim 2, wherein the control portion controls the exposure unit in the first operation such that an exposure amount to the non-transfer area by the exposure unit is equal to or more than an exposure amount to the transfer area by the exposure unit.

4. An image forming apparatus according to claim 1, wherein the control portion controls the transfer power source in the first operation so as to apply a voltage, having the normal polarity, of which an absolute value is greater than a surface potential of the photosensitive member at the transfer portion, to the transfer member.

5. An image forming apparatus according to claim 1, wherein the control portion controls the transfer power source in the first operation so as to apply a voltage, having the normal polarity, which causes a potential difference between the photosensitive member and the transfer member to become equal to or less than an electric discharge threshold, to the transfer member.

6. An image forming apparatus according to claim 1, wherein the control portion controls to perform the first operation based on an index value correlating with time duration when a charging process of the photosensitive member is performed.

7. An image forming apparatus according to claim 6, wherein the index value includes a history of paper passing of the recording material, rotation time of the photosensitive member, a number of rotations of the photosensitive member, or a rotation distance of the photosensitive member.

8. An image forming apparatus according to claim 1, wherein the control portion controls to perform the first operation based on a surface potential of the photosensitive member at the non-transfer area.

9. An image forming apparatus according to claim 8, wherein the control portion controls to perform the first operation based on a potential difference between the surface potential of the photosensitive member at the non-transfer area and the surface potential of the photosensitive member at a transfer area in contact with the transfer member on the surface of the photosensitive member.

10. An image forming apparatus according to claim 1, wherein the control portion controls to change a performing frequency of the first operation correlating with a number of materials on which the toner image is transferred from performing the first operation until performing the first operation next.

11. An image forming apparatus according to claim 10, wherein the control portion controls to change the performing frequency based on an environment or a usage history of the image forming apparatus.

12. An image forming apparatus according to claim 10, wherein the control portion controls to change the performing frequency based on image information of the toner image formed from performing the first operation until performing the first operation next.

13. An image forming apparatus according to claim 12, wherein the control portion controls to change the transfer voltage during transfer of the toner image based on the image information.

14. An image forming apparatus according to claim 12, wherein the image information is print ratio information.

15. An image forming apparatus according to claim 14, wherein the control portion controls so as to reduce the performing frequency in a case in which the print ratio information is less than a predetermined threshold value.

16. An image forming apparatus according to claim 1, wherein the control portion controls to change a performing time of the first operation correlating with rotation time of the photosensitive member in the first operation.

17. An image forming apparatus according to claim 16, wherein the control portion controls to change the performing time based on an environment or a usage history of the image forming apparatus.

18. An image forming apparatus according to claim 16, wherein the control portion controls to change the performing time based on image information of the toner image formed from performing the first operation until performing the first operation next.

19. An image forming apparatus according to claim 18, wherein the control portion controls so as to change the transfer voltage during transfer of the toner image based on the image information.

20. An image forming apparatus according to claim 18, wherein the image information is print ratio information.

21. An image forming apparatus according to claim 20, wherein the control portion controls so as to shorten the performing time in a case in which the print ratio information is less than a predetermined threshold value.

* * * * *